(12) United States Patent
Zhao et al.

(10) Patent No.: US 11,349,693 B2
(45) Date of Patent: May 31, 2022

(54) UPLINK SIGNAL SENDING METHOD AND RECEIVING METHOD, COMMUNICATIONS DEVICE, AND NETWORK DEVICE

(71) Applicant: Huawei Technologies Co., Ltd., Shenzhen (CN)

(72) Inventors: Yue Zhao, Beijing (CN); Zheng Yu, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 111 days.

(21) Appl. No.: 16/991,834

(22) Filed: Aug. 12, 2020

(65) Prior Publication Data

US 2020/0374163 A1 Nov. 26, 2020

Related U.S. Application Data

(63) Continuation of application No. PCT/CN2018/076765, filed on Feb. 13, 2018.

(51) Int. Cl.
*H04L 27/18* (2006.01)
*H04L 1/00* (2006.01)
(Continued)

(52) U.S. Cl.
CPC .......... *H04L 27/183* (2013.01); *H04L 1/0004* (2013.01); *H04W 72/042* (2013.01); *H04W 72/1263* (2013.01)

(58) Field of Classification Search
CPC .. H04L 27/183; H04L 1/0004; H04W 72/042; H04W 72/1263
See application file for complete search history.

(56) References Cited

U.S. PATENT DOCUMENTS

2015/0071099 A1 3/2015 Yi et al.
2018/0115387 A1* 4/2018 Takeda .................... H04B 7/02
(Continued)

FOREIGN PATENT DOCUMENTS

CN 101754274 A 6/2010
CN 104769857 A 7/2015
(Continued)

OTHER PUBLICATIONS

"Consideration on uplink data transmission for NB-IoT," 3GPP TSG RAN WG1 NB-IoT Meeting #84, St Julian's, Malta, R1-160480, pp. 1-13, 3rd Generation Partnership Project, Valbonne, France (Feb. 15-19, 2016).
(Continued)

*Primary Examiner* — Ronald B Abelson
(74) *Attorney, Agent, or Firm* — Leydig, Voit & Mayer, Ltd.

(57) ABSTRACT

This application provides an uplink signal sending method and receiving method, a communications device, and a network device. The method includes: receiving, by a terminal device, downlink control information DCI sent by a network device; determining, by the terminal device based on the DCI, a transport block size TBS used for transmitting an uplink signal; and sending, by the terminal device, the uplink signal on two contiguous uplink subcarriers in a Pi/2 BPSK modulation mode based on the determined transport block size. Therefore, the uplink signal is transmitted in the Pi/2 BPSK modulation mode by using the determined transport block size.

16 Claims, 5 Drawing Sheets

(51) Int. Cl.
*H04W 72/04* (2009.01)
*H04W 72/12* (2009.01)

(56) References Cited

U.S. PATENT DOCUMENTS

| | | | |
|---|---|---|---|
| 2018/0316464 A1* | 11/2018 | Stern-Berkowitz | ................ H04W 72/042 |
| 2019/0044646 A1* | 2/2019 | Xu | ........ H04L 1/0025 |
| 2019/0222457 A1* | 7/2019 | Wei | ........ H04L 5/0051 |
| 2020/0037298 A1* | 1/2020 | Shi | ........ H04L 1/1812 |

FOREIGN PATENT DOCUMENTS

| CN | 104871468 A | 8/2015 |
|---|---|---|
| CN | 106464428 A | 2/2017 |
| CN | 107046453 A | 8/2017 |
| CN | 107196735 A | 9/2017 |
| CN | 107210844 A | 9/2017 |
| EP | 3413492 A1 | 12/2018 |
| WO | 2016119881 A1 | 8/2016 |
| WO | 2017003047 A1 | 1/2017 |
| WO | 2017133552 A1 | 8/2017 |

OTHER PUBLICATIONS

"3rd Generation Partnership Project; Technical Specification Group Radio Access Network; Evolved Universal Terrestrial Radio Access (E-UTRA); Physical layer procedures (Release 15)," 3GPP TS 36.213 V15.0.0, total 493 pages, 3rd Generation Partnership Project, Valbonne, France (Dec. 2017).

* cited by examiner

UPLINK SIGNAL SENDING METHOD AND RECEIVING METHOD, COMMUNICATIONS DEVICE, AND NETWORK DEVICE

CROSS-REFERENCE TO RELATED APPLICATIONS

This application is a continuation of International Application No. PCT/CN2018/076765, filed on Feb. 13, 2018, the disclosure of which is hereby incorporated by reference in its entirety.

TECHNICAL FIELD

This application relates to the field of communications technologies, and in particular, to an uplink signal sending method and receiving method, a communications device, and a network device.

BACKGROUND

In a future version of long term evolution-advanced (LTE-A), low-cost/low-end (or low-complexity) user equipment (UE) that centers on data communication has been considered, and the UE may be referred to as machine type communication (MTC) UE. The MTC UE has a small amount of to-be-transmitted data, and occasionally performs uplink data sending/downlink data receiving.

Therefore, in the prior art, before performing uplink data sending/downlink data receiving, the MTC UE obtains resource allocation information by using a resource allocation field sent by a base station and obtains MCS information based on a modulation and coding scheme (MCS) field, and then queries a resource allocation information table based on the MCS information and the resource allocation information, so as to obtain a transport block size allocated by the base station to the MTC UE. An existing TBS table includes only a quadrature phase shift keying (QPSK) modulation mode. Therefore, in the QPSK modulation mode, an uplink signal is sent on an uplink subcarrier based on a determined transport block size. However, when a modulation mode is another modulation mode (for example, a Pi/2 binary phase shift keying (BPSK) modulation mode), how the MTC UE determines a corresponding transport block size and how to transmit an uplink signal based on the determined transport size are problems to be urgently resolved by a person skilled in the art.

SUMMARY

This application provides an uplink signal sending method and receiving method, a communications device, and a network device, to resolve a prior-art problem of how to determine a corresponding transport block size and how to transmit an uplink signal based on the determined transport size when a modulation mode is another modulation mode (for example, a Pi/2 BPSK modulation mode).

According to a first aspect, an embodiment of this application provides an uplink signal sending method, and the method may include:

receiving, by a terminal device, downlink control information DCI sent by a network device;

determining, by the terminal device based on the DCI, a transport block size TBS used for transmitting an uplink signal; and sending, by the terminal device, the uplink signal on two contiguous uplink subcarriers in a Pi/2 BPSK modulation mode based on the determined transport block size.

It can be learned that, before sending the uplink signal, the terminal device first determines, based on the DCI sent by the network device, the transport block size TBS used for transmitting the uplink signal, and sends the uplink signal on the two contiguous uplink subcarriers in the Pi/2 BPSK modulation mode based on the determined transport block size after determining the transport block size, so as to complete transmission of the uplink signal in the Pi/2 BPSK modulation mode by using the determined transport block size.

In a possible implementation, the DCI includes index indication information and resource unit quantity indication information, and the index indication information is used to indicate an MCS index.

The determining, by the terminal device based on the DCI, a transport block size TBS used for transmitting an uplink signal includes:

determining, by the terminal device, a TBS index based on the index indication information and a first mapping relationship, where the first mapping relationship is used to indicate a relationship between an MCS index, a modulation mode, and a TBS index; and determining, by the terminal device based on the TBS index and the resource unit quantity indication information, the transport block size used for transmitting the uplink signal.

The first mapping relationship includes a first part and a second part, the first part is used to indicate a relationship between an MCS index, a QPSK modulation mode, and a TBS index, and the second part is used to indicate a relationship between an MCS index, the Pi/2 BPSK modulation mode, and a TBS index.

The second part includes S TBS indexes, and/or a maximum value of a transport block size in the second part is 936 or 1000, where S is a positive integer, and S is greater than 2 and less than or equal to 5.

In a possible implementation, when the MCS index indicated by the index indication information belongs to the first part and a quantity of resource units is N, the TBS is determined based on a column corresponding to a $K^{th}$ physical resource block PRB in a TBS table that is set in an existing standard and the TBS index corresponding to the index indication information; or when the MCS index indicated by the index indication information belongs to the second part and a quantity of resource units is 2×N, the TBS is determined based on a column corresponding to a $K^{th}$ PRB in a TBS table that is set in an existing standard and the TBS index corresponding to the index indication information, where N and K are positive integers.

In a possible implementation, the DCI includes index indication information and resource unit quantity indication information, the index indication information is used to indicate an MCS index, the DCI further includes carrier quantity indication information and/or modulation mode information, and the carrier quantity indication information and/or the modulation mode information are/is used to determine a modulation mode.

The determining, by the terminal device based on the DCI, a transport block size TBS used for transmitting an uplink signal includes:

determining, by the terminal device, a TBS index based on the MCS index and a second mapping relationship, where the second mapping relationship is used to indicate a relationship between an MCS index and a TBS index; and determining, by the terminal device based on the TBS index, the resource unit quantity indication information, and the carrier quantity indication information and/or the modulation mode information, the transport block size used for transmitting the uplink signal.

In a possible implementation, when the carrier quantity indication information and/or the modulation mode information indicate/indicates that the modulation mode is a QPSK modulation mode, and the resource unit quantity indication information indicates that a quantity of resource units is P, the TBS is determined based on a column corresponding to an $M^{th}$ PRB in a TBS table that is set in a standard and the TBS index corresponding to the index indication information; or when the carrier quantity indication information and/or the modulation mode information indicate/indicates that the modulation mode is the pi/2 BPSK modulation mode, and the resource unit quantity indication information indicates that a quantity of resource units is 2×P, the TBS is determined based on a column corresponding to an $M^{th}$ PRB in a TBS table that is set in a standard and the TBS index corresponding to the index indication information, where M and K are positive integers.

In a possible implementation, the DCI includes index indication information, and there is a mapping relationship between the index indication information and the transport block size.

The determining, by the terminal device based on the DCI, a transport block size TBS for the uplink signal includes:

determining, by the terminal device, the transport block size for the uplink signal based on the index indication information.

A maximum value of the TBS is 224, 256, 456, 504, 712, 808, 936, or 1000.

In a possible implementation, the method may further include:

determining, by the terminal device, a quantity of resource units based on the index indication information.

According to a second aspect, an embodiment of this application further provides an uplink signal receiving method, and the method may include:

sending, by a network cable device, downlink control information DCI to a terminal device; and receiving, by the network device, an uplink signal sent by the terminal device on two contiguous uplink subcarriers, and demodulating the uplink signal in a Pi/2 BPSK modulation mode.

It can be learned that, before the network device receives the uplink signal, the network device first sends the DCI to the terminal device. Therefore, the terminal device may determine, based on the DCI, the transport block size TBS used for transmitting the uplink signal, and send the uplink signal on the two contiguous uplink subcarriers in the Pi/2 BPSK modulation mode based on the determined transport block size after determining the transport block size. Correspondingly, the network device may demodulate the uplink signal in the Pi/2 BPSK modulation mode after the network device receives the uplink signal sent by the terminal device on the two contiguous uplink subcarriers. Therefore, the uplink signal is transmitted in the Pi/2 BPSK modulation mode by using the determined transport block size.

In a possible implementation, the DCI includes index indication information and resource unit quantity indication information, and the index indication information is used to indicate an MCS index.

Before the sending, by a network cable device, downlink control information DCI to a terminal device, the method further includes:

determining, by the network device, a TBS index based on the resource unit quantity indication information and a transport block size; and determining, by the network device, the MCS index based on the TBS index and a first mapping relationship, where the first mapping relationship is used to indicate a relationship between an MCS index, a modulation mode, and a TBS index.

The first mapping relationship includes a first part and a second part, the first part is used to indicate a relationship between an MCS index, a QPSK modulation mode, and a TBS index, and the second part is used to indicate a relationship between an MCS index, the Pi/2 BPSK modulation mode, and a TBS index.

The second part includes S TBS indexes, and/or a maximum value of a transport block size in the second part is 936 or 1000.

In a possible implementation, when the MCS index indicated by the index indication information belongs to the first part and a quantity of resource units is N, the TBS index is determined based on a column corresponding to a $K^{th}$ physical resource block PRB in a TBS table that is set in an existing standard and the transport block size; or when the MCS index indicated by the index indication information belongs to the second part and a quantity of resource units is 2×N, the TBS index is determined based on a column corresponding to a $K^{th}$ PRB in a TBS table that is set in an existing standard and the transport block size, where N and K are positive integers.

In a possible implementation, the DCI includes index indication information and resource unit quantity indication information, the index indication information is used to indicate an MCS index, the DCI further includes carrier quantity indication information and/or modulation mode information, and the carrier quantity indication information and/or the modulation mode information are/is used to determine a modulation mode.

Before the network device determines, based on the DCI, a transport block size TBS used for transmitting an uplink signal, the method further includes:

determining, by the network device, a TBS index based on the resource unit quantity indication information, the carrier quantity indication information and/or the modulation mode information, and a transport block size; and determining, by the network device, the MCS index based on the TBS index and a second mapping relationship, where the second mapping relationship is used to indicate a relationship between an MCS index and a TBS index.

In a possible implementation, when the carrier quantity indication information and/or the modulation mode information indicate/indicates that the modulation mode is a QPSK modulation mode, and the resource unit quantity indication information indicates that a quantity of resource units is P, the TBS index is determined based on a column corresponding to an $M^{th}$ PRB in a TBS table that is set in a standard and the transport block size; or when the carrier quantity indication information and/or the modulation mode information indicate/indicates that the modulation mode is the pi/2 BPSK modulation mode, and the resource unit quantity indication information indicates that a quantity of resource units is 2×P, the TBS index is determined based on a column corresponding to an $M^{th}$ PRB in a TBS table that is set in a standard and the transport block size, where M and K are positive integers.

In a possible implementation, the DCI includes index indication information, and there is a mapping relationship between the index indication information and a transport block size; and before the network device determines the transport block size TBS for the uplink signal based on the DCI, the method further includes:

determining, by the network device, the index indication information based on the transport block size.

A maximum value of the TBS is 224, 256, 456, 504, 712, 808, 936, or 1000.

In a possible implementation, the method may further include:

determining, by the network device, a quantity of resource units based on the transport block size.

According to a third aspect, an embodiment of this application provides a communications device, and the communications device may include:

a receiving unit, configured to receive downlink control information DCI sent by a network device;

a processing unit, configured to determine, based on the DCI, a transport block size TBS used for transmitting an uplink signal; and a sending unit, configured to send the uplink signal on two contiguous uplink subcarriers in a Pi/2 BPSK modulation mode based on the determined transport block size.

In a possible implementation, the DCI includes index indication information and resource unit quantity indication information, and the index indication information is used to indicate an MCS index.

The processing unit is specifically configured to: determine a TBS index based on the index indication information and a first mapping relationship, where the first mapping relationship is used to indicate a relationship between an MCS index, a modulation mode, and a TBS index; and determine, based on the TBS index and the resource unit quantity indication information, the transport block size used for transmitting the uplink signal.

The first mapping relationship includes a first part and a second part, the first part is used to indicate a relationship between an MCS index, a QPSK modulation mode, and a TBS index, and the second part is used to indicate a relationship between an MCS index, the Pi/2 BPSK modulation mode, and a TBS index.

The second part includes S TBS indexes, and/or a maximum value of a transport block size in the second part is 936 or 1000, where S is a positive integer, and S is greater than 2 and less than or equal to 5.

In a possible implementation, when the MCS index indicated by the index indication information belongs to the first part and a quantity of resource units is N, the TBS is determined based on a column corresponding to a $K^{th}$ physical resource block PRB in a TBS table that is set in an existing standard and the TBS index corresponding to the index indication information; or when the MCS index indicated by the index indication information belongs to the second part and a quantity of resource units is 2×N, the TBS is determined based on a column corresponding to a $K^{th}$ PRB in a TBS table that is set in an existing standard and the TBS index corresponding to the index indication information, where N and K are positive integers.

In a possible implementation, the DCI includes index indication information and resource unit quantity indication information, the index indication information is used to indicate an MCS index, the DCI further includes carrier quantity indication information and/or modulation mode information, and the carrier quantity indication information and/or the modulation mode information are/is used to determine a modulation mode.

The processing unit is further specifically configured to: determine a TBS index based on the MCS index and a second mapping relationship, where the second mapping relationship is used to indicate a relationship between an MCS index and a TBS index; and determine, based on the TBS index, the resource unit quantity indication information, and the carrier quantity indication information and/or the modulation mode information, the transport block size used for transmitting the uplink signal.

In a possible implementation, when the carrier quantity indication information and/or the modulation mode information indicate/indicates that the modulation mode is a QPSK modulation mode, and the resource unit quantity indication information indicates that a quantity of resource units is P, the TBS is determined based on a column corresponding to an $M^{th}$ PRB in a TBS table that is set in a standard and the TBS index corresponding to the index indication information; or when the carrier quantity indication information and/or the modulation mode information indicate/indicates that the modulation mode is the pi/2 BPSK modulation mode, and the resource unit quantity indication information indicates that a quantity of resource units is 2×P, the TBS is determined based on a column corresponding to an $M^{th}$ PRB in a TBS table that is set in a standard and the TBS index corresponding to the index indication information, where M and K are positive integers.

In a possible implementation, the DCI includes index indication information, and there is a mapping relationship between the index indication information and the transport block size.

The processing unit is further specifically configured to determine the transport block size for the uplink signal based on the index indication information.

A maximum value of the TBS is 224, 256, 456, 504, 712, 808, 936, or 1000.

In a possible implementation, the processing unit is further configured to determine a quantity of resource units based on the index indication information.

According to a fourth aspect, an embodiment of this application provides a network device, and the network device may include:

a sending unit, configured to send downlink control information DCI to a terminal device;

a receiving unit, configured to receive an uplink signal sent by the terminal device on two contiguous uplink subcarriers; and a processing unit, configured to demodulate the uplink signal in a Pi/2 BPSK modulation mode.

In a possible implementation, the DCI includes index indication information and resource unit quantity indication information, and the index indication information is used to indicate an MCS index.

The processing unit is further configured to: determine a TBS index based on the resource unit quantity indication information and a transport block size; and determine the MCS index based on the TBS index and a first mapping relationship, where the first mapping relationship is used to indicate a relationship between an MCS index, a modulation mode, and a TBS index.

The first mapping relationship includes a first part and a second part, the first part is used to indicate a relationship between an MCS index, a QPSK modulation mode, and a TBS index, and the second part is used to indicate a relationship between an MCS index, the Pi/2 BPSK modulation mode, and a TBS index.

The second part includes S TBS indexes, and/or a maximum value of a transport block size in the second part is 936 or 1000.

In a possible implementation, when the MCS index indicated by the index indication information belongs to the first part and a quantity of resource units is N, the TBS index is determined based on a column corresponding to a $K^{th}$ physical resource block PRB in a TBS table that is set in an existing standard and the transport block size; or when the MCS index indicated by the index indication information belongs to the second part and a quantity of resource units is 2×N, the TBS index is determined based on a column corresponding to a $K^{th}$ PRB in a TBS table that is set in an existing standard and the transport block size, where N and K are positive integers.

In a possible implementation, the DCI includes index indication information and resource unit quantity indication information, the index indication information is used to indicate an MCS index, the DCI further includes carrier quantity indication information and/or modulation mode information, and the carrier quantity indication information and/or the modulation mode information are/is used to determine a modulation mode.

The processing unit is further configured to: determine a TBS index based on the resource unit quantity indication information, the carrier quantity indication information and/or the modulation mode information, and a transport block size; and determine the MCS index based on the TBS index and a second mapping relationship, where the second mapping relationship is used to indicate a relationship between an MCS index and a TBS index.

In a possible implementation, when the carrier quantity indication information and/or the modulation mode information indicate/indicates that the modulation mode is a QPSK modulation mode, and the resource unit quantity indication information indicates that a quantity of resource units is P, the TBS index is determined based on a column corresponding to an $M^{th}$ PRB in a TBS table that is set in a standard and the transport block size; or when the carrier quantity indication information and/or the modulation mode information indicate/indicates that the modulation mode is the pi/2 BPSK modulation mode, and the resource unit quantity indication information indicates that a quantity of resource units is 2×P, the TBS index is determined based on a column corresponding to an $M^{th}$ PRB in a TBS table that is set in a standard and the transport block size, where M and K are positive integers.

In a possible implementation, the DCI includes index indication information, and there is a mapping relationship between the index indication information and a transport block size.

The processing unit is further configured to determine the index indication information based on the transport block size.

A maximum value of the TBS is 224, 256, 456, 504, 712, 808, 936, or 1000.

In a possible implementation, the processing unit is further configured to determine a quantity of resource units based on the transport block size.

According to a fifth aspect, an embodiment of this application further provides a communications device. The communications device may include a receiver, a processor, and a transmitter. The receiver, the processor, and the transmitter are connected by using a communications bus.

The receiver is configured to receive downlink control information DCI sent by a network device.

The processor is configured to determine, based on the DCI, a transport block size TBS used for transmitting an uplink signal.

The transmitter is configured to send the uplink signal on two contiguous uplink subcarriers in a Pi/2 BPSK modulation mode based on the determined transport block size.

In a possible implementation, the DCI includes index indication information and resource unit quantity indication information, and the index indication information is used to indicate an MCS index.

The processor is specifically configured to: determine a TBS index based on the index indication information and a first mapping relationship, where the first mapping relationship is used to indicate a relationship between an MCS index, a modulation mode, and a TBS index; and determine, based on the TBS index and the resource unit quantity indication information, the transport block size used for transmitting the uplink signal.

The first mapping relationship includes a first part and a second part, the first part is used to indicate a relationship between an MCS index, a QPSK modulation mode, and a TBS index, and the second part is used to indicate a relationship between an MCS index, the Pi/2 BPSK modulation mode, and a TBS index.

The second part includes S TBS indexes, and/or a maximum value of a transport block size in the second part is 936 or 1000, where S is a positive integer, and S is greater than 2 and less than or equal to 5.

In a possible implementation, when the MCS index indicated by the index indication information belongs to the first part and a quantity of resource units is N, the TBS is determined based on a column corresponding to a $K^{th}$ physical resource block PRB in a TBS table that is set in an existing standard and the TBS index corresponding to the index indication information; or when the MCS index indicated by the index indication information belongs to the second part and a quantity of resource units is 2×N, the TBS is determined based on a column corresponding to a $K^{th}$ PRB in a TBS table that is set in an existing standard and the TBS index corresponding to the index indication information, where N and K are positive integers.

In a possible implementation, the DCI includes index indication information and resource unit quantity indication information, the index indication information is used to indicate an MCS index, the DCI further includes carrier quantity indication information and/or modulation mode information, and the carrier quantity indication information and/or the modulation mode information are/is used to determine a modulation mode.

The processor is further specifically configured to: determine a TBS index based on the MCS index and a second mapping relationship, where the second mapping relationship is used to indicate a relationship between an MCS index and a TBS index; and determine, based on the TBS index, the resource unit quantity indication information, and the carrier quantity indication information and/or the modulation mode information, the transport block size used for transmitting the uplink signal.

In a possible implementation, when the carrier quantity indication information and/or the modulation mode information indicate/indicates that the modulation mode is a QPSK modulation mode, and the resource unit quantity indication information indicates that a quantity of resource units is P, the TBS is determined based on a column corresponding to an $M^{th}$ PRB in a TBS table that is set in a standard and the TBS index corresponding to the index indication information; or when the carrier quantity indication information and/or the modulation mode information indicate/indicates that the modulation mode is the pi/2 BPSK modulation mode, and the resource unit quantity indication information indicates that a quantity of resource units is 2×P, the TBS is determined based on a column corresponding to an $M^{th}$ PRB in a TBS table that is set in a standard and the TBS index corresponding to the index indication information, where M and K are positive integers.

In a possible implementation, the DCI includes index indication information, and there is a mapping relationship between the index indication information and the transport block size.

The processor is further specifically configured to determine the transport block size for the uplink signal based on the index indication information.

A maximum value of the TBS is 224, 256, 456, 504, 712, 808, 936, or 1000.

In a possible implementation, the processor is further configured to determine a quantity of resource units based on the index indication information.

According to a sixth aspect, an embodiment of this application further provides a network device. The network device may include a transmitter, a receiver, and a processor. The transmitter, the receiver, and the processor are connected by using a communications bus.

The transmitter is configured to send downlink control information DCI to a terminal device.

The receiver is configured to receive an uplink signal sent by the terminal device on two contiguous uplink subcarriers.

The processor is configured to demodulate the uplink signal in a Pi/2 BPSK modulation mode.

In a possible implementation, the DCI includes index indication information and resource unit quantity indication information, and the index indication information is used to indicate an MCS index.

The processor is further configured to: determine a TBS index based on the resource unit quantity indication information and a transport block size; and determine the MCS index based on the TBS index and a first mapping relationship, where the first mapping relationship is used to indicate a relationship between an MCS index, a modulation mode, and a TBS index.

The first mapping relationship includes a first part and a second part, the first part is used to indicate a relationship between an MCS index, a QPSK modulation mode, and a TBS index, and the second part is used to indicate a relationship between an MCS index, the Pi/2 BPSK modulation mode, and a TBS index.

The second part includes S TBS indexes, and/or a maximum value of a transport block size in the second part is 936 or 1000.

In a possible implementation, when the MCS index indicated by the index indication information belongs to the first part and a quantity of resource units is N, the TBS index is determined based on a column corresponding to a $K^{th}$ physical resource block PRB in a TBS table that is set in an existing standard and the transport block size; or when the MCS index indicated by the index indication information belongs to the second part and a quantity of resource units is 2×N, the TBS index is determined based on a column corresponding to a $K^{th}$ PRB in a TBS table that is set in an existing standard and the transport block size, where N and K are positive integers.

In a possible implementation, the DCI includes index indication information and resource unit quantity indication information, the index indication information is used to indicate an MCS index, the DCI further includes carrier quantity indication information and/or modulation mode information, and the carrier quantity indication information and/or the modulation mode information are/is used to determine a modulation mode.

The processor is further configured to: determine a TBS index based on the resource unit quantity indication information, the carrier quantity indication information and/or the modulation mode information, and a transport block size; and determine the MCS index based on the TBS index and a second mapping relationship, where the second mapping relationship is used to indicate a relationship between an MCS index and a TBS index.

In a possible implementation, when the carrier quantity indication information and/or the modulation mode information indicate/indicates that the modulation mode is a QPSK modulation mode, and the resource unit quantity indication information indicates that a quantity of resource units is P, the TBS index is determined based on a column corresponding to an $M^{th}$ PRB in a TBS table that is set in a standard and the transport block size; or when the carrier quantity indication information and/or the modulation mode information indicate/indicates that the modulation mode is the pi/2 BPSK modulation mode, and the resource unit quantity indication information indicates that a quantity of resource units is 2×P, the TBS index is determined based on a column corresponding to an $M^{th}$ PRB in a TBS table that is set in a standard and the transport block size, where M and K are positive integers.

In a possible implementation, the DCI includes index indication information, and there is a mapping relationship between the index indication information and a transport block size.

The processor is further configured to determine the index indication information based on the transport block size.

A maximum value of the TBS is 224, 256, 456, 504, 712, 808, 936, or 1000.

In a possible implementation, the processor is further configured to determine a quantity of resource units based on the transport block size.

In the first aspect to the sixth aspect of the embodiments of this application, in a possible implementation, the S TBS indexes in the second part are S TBS indexes in the first part.

In the first aspect to the sixth aspect of the embodiments of this application, in a possible implementation, a maximum value of the TBS is 936, 1000, or 1032.

In the first aspect to the sixth aspect of the embodiments of this application, in a possible implementation, when the quantity of resource units is 1, the maximum value of the TBS is 224 or 256; and/or when the quantity of resource units is 2, the maximum value of the TBS is 456 or 504; and/or when the quantity of resource units is 3, the maximum value of the TBS is 712 or 808; and/or when the quantity of resource units is 4, the maximum value of the TBS is 936 or 1000.

In the first aspect to the sixth aspect of the embodiments of this application, in a possible implementation, when a coverage level of the terminal device is ModeB, the quantity of resource units is 2 or 4.

According to a seventh aspect, an embodiment of this application further provides a communications device. The communications device may include a processor and a memory.

The memory is configured to store a program instruction.

The processor is configured to invoke and execute the program instruction stored in the memory, to perform the uplink signal sending method according to any one of the first aspect or the possible implementations of the first aspect.

According to an eighth aspect, an embodiment of this application further provides a network device. The network device may include a processor and a memory.

The memory is configured to store a program instruction.

The processor is configured to invoke and execute the program instruction stored in the memory, to perform the uplink signal receiving method according to any one of the second aspect or the possible implementations of the second aspect.

According to a ninth aspect, an embodiment of this application further provides a computer-readable storage medium. The computer-readable storage medium stores a computer program, and when the computer program is executed by a processor, the processor performs the uplink signal sending method according to any one of the first aspect or the possible implementations of the first aspect.

According to a tenth aspect, an embodiment of this application further provides a computer-readable storage medium. The computer-readable storage medium stores a computer program, and when the computer program is executed by a processor, the processor performs the uplink signal receiving method according to any one of the second aspect or the possible implementations of the second aspect.

According to an eleventh aspect, an embodiment of this application further provides a chip. The chip stores a computer program, and when the computer program is executed by a processor, the processor performs the uplink signal sending method according to any one of the first aspect or the possible implementations of the first aspect.

According to a twelfth aspect, an embodiment of this application further provides a chip. The chip stores a computer program, and when the computer program is executed by a processor, the processor performs the uplink signal receiving method according to any one of the second aspect or the possible implementations of the second aspect.

According to a thirteenth aspect, an embodiment of this application further provides a communications system. The communications system includes the communications device provided in any one of the third aspect, the fifth aspect, and the seventh aspect and the network device provided in any one of the fourth aspect, the sixth aspect, and the eighth aspect.

According to the uplink signal sending method and receiving method, the communications device, and the network device provided in the embodiments of this application, the terminal device receives the downlink control information DCI sent by the network device, determines, based on the DCI, the transport block size TBS used for transmitting the uplink signal, and then sends the uplink signal on the two contiguous uplink subcarriers in the Pi/2 BPSK modulation mode based on the determined TBS. It can be learned that, before sending the uplink signal, the terminal device first determines, based on the DCI sent by the network device, the transport block size TBS used for transmitting the uplink signal, and sends the uplink signal on the two contiguous uplink subcarriers in the Pi/2 BPSK modulation mode based on the determined transport block size after determining the transport block size, so as to complete transmission of the uplink signal in the Pi/2 BPSK modulation mode by using the determined transport block size. Correspondingly, the network device may demodulate, in the Pi/2 BPSK modulation mode, the uplink signal received on the two contiguous uplink subcarriers, so as to receive the uplink signal in the Pi/2 BPSK modulation mode.

DESCRIPTION OF EMBODIMENTS

The embodiments of this application are applied to a 5G communications system or another future system. The following describes some terms used in this application, to help understanding of a person skilled in the art. It should be noted that, when solutions in the embodiments of this application are applied to the 5G communications system or the another future system, names of a network device and a terminal may change, but this does not affect implementation of the solutions in the embodiments of this application.

Figure 1:
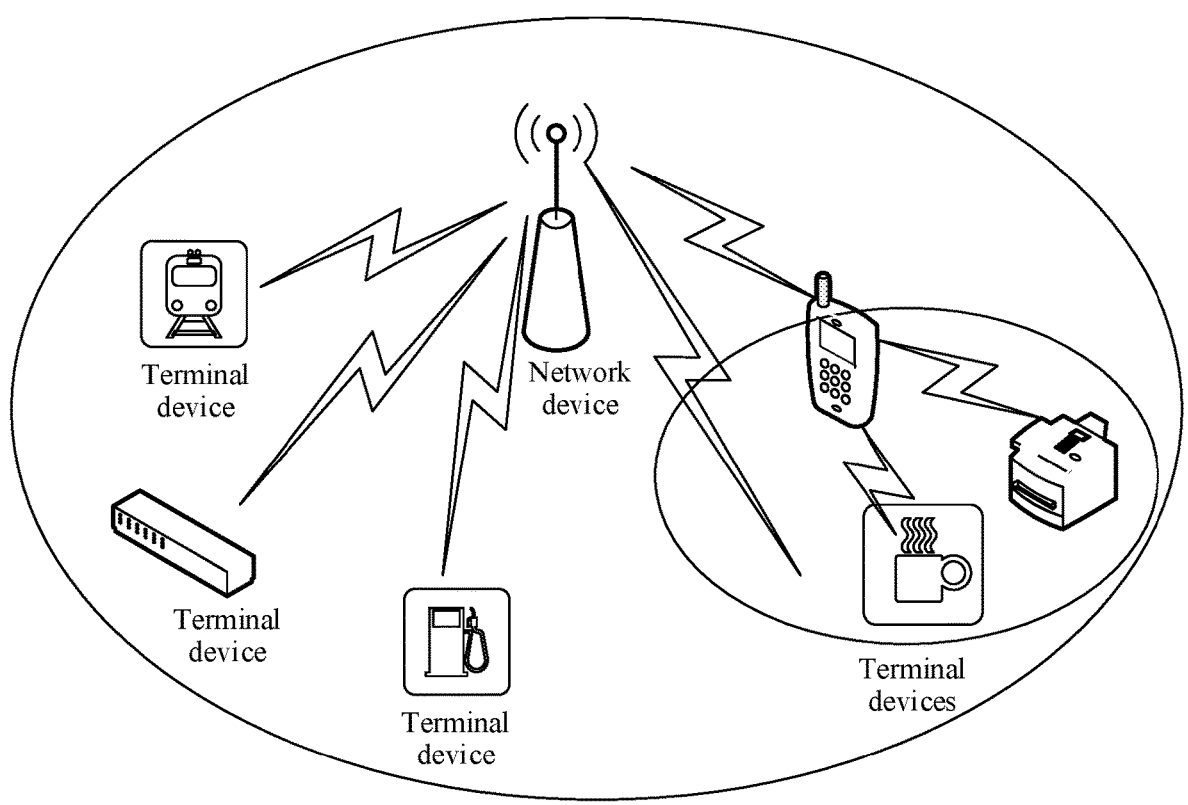
FIG. 1 is a schematic diagram of an application scenario according to an embodiment of this application.

FIG. 1 is a schematic diagram of an application scenario according to an embodiment of this application. A communications system in which a terminal device whose coverage enhancement level is B is located is used as an example. When the coverage level of the terminal device is ModeB, a quantity of resource units that can be supported by the terminal device is 2 or 4. In other words, the terminal device can support two resource units or can support four resource units. However, the terminal device can support only two or four resource units in each transmission process. Certainly, the terminal device may alternatively be a terminal device whose coverage enhancement level is A. Referring to FIG. 1, the communications system may include at least one terminal device and a network device. The network device sends DCI to the terminal device, so that the terminal device can determine, based on the DCI, a transport block size used for transmitting data, and send an uplink signal on two contiguous uplink subcarriers based on the determined transport block size.

(1) The terminal device is also referred to as a terminal or user equipment, and is a device that provides voice and/or data connectivity for a user, for example, a handheld device having a wireless connection function or a vehicle-mounted device. A common terminal device is, for example, a mobile phone, a tablet computer, a notebook computer, a palmtop computer, a mobile internet device (MID), or a wearable device. The wearable device is, for example, a smart watch, a smart band, or a pedometer.

(2) The network device is also referred to as a radio access network (RAN) device, and is a device for connecting the terminal device to a wireless network. The network device includes network devices in various communication standards, for example, including but not limited to a base station, an evolved NodeB (eNB), a radio network controller (RNC), a NodeB (NB), a network device controller (Base Station Controller, BSC), a network device transceiver station (Base Transceiver Station, BTS), a home network device (for example, Home evolved NodeB or Home Node B, HNB), and a baseband unit (BBU).

The network device includes network devices of various frequency standards, for example, including but not limited to a low-frequency network device and a high-frequency network device.

(3) "A plurality of" means two or more, and other quantifiers are similar. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

To resolve prior-art problems of how to determine a corresponding transport block size and how to transmit an uplink signal based on the determined transport size when a modulation mode is another modulation mode (for example, a Pi/2 BPSK modulation mode), an embodiment of this application provides an uplink signal sending method. Therefore, before sending an uplink signal, a terminal device first receives downlink control information DCI sent by a network device, and determines, based on the DCI, a transport block size TBS used for transmitting the uplink signal. After determining the transport block size, the terminal device sends the uplink signal on two contiguous uplink subcarriers in a Pi/2 BPSK modulation mode based on the determined transport block size. Therefore, the uplink signal is transmitted in the Pi/2 BPSK modulation mode by using the determined transport block size. Correspondingly, the network device may demodulate, in the Pi/2 BPSK modulation mode, the uplink signal received on the two contiguous uplink subcarriers, to receive the uplink signal in the Pi/2 BPSK modulation mode.

Figure 2:
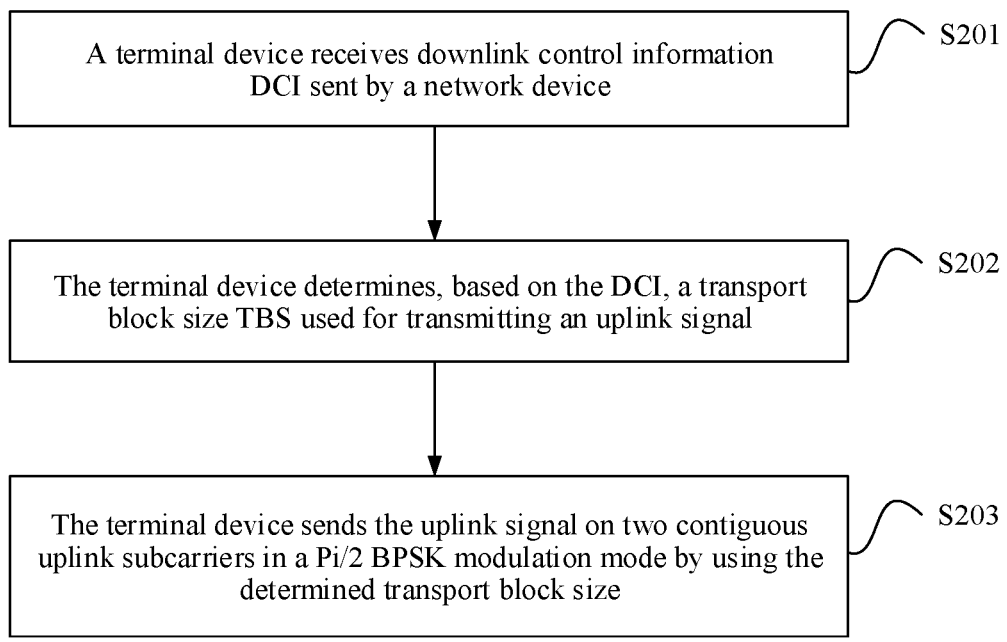
FIG. 2 is a schematic diagram of an uplink signal sending method according to an embodiment of this application.

FIG. 2 is a schematic diagram of an uplink signal sending method according to an embodiment of this application. The uplink signal sending method may include the following steps:

S201: A terminal device receives downlink control information DCI sent by a network device.

S202: The terminal device determines, based on the DCI, a transport block size TBS used for transmitting an uplink signal.

S203: The terminal device sends the uplink signal on two contiguous uplink subcarriers in a Pi/2 BPSK modulation mode based on the determined transport block size.

The two contiguous subcarriers may be two adjacent subcarriers in three contiguous subcarriers. Locations of the two subcarriers in the three subcarriers are unified at a cell level, and may be fixed or may be configured by using higher layer signaling/RRC signaling.

It should be noted that, in this embodiment of this application, before sending the uplink signal by using the determined transport block size, the terminal device may determine, in at least three possible implementations below, the transport block size used for transmitting the uplink signal. In a possible implementation, an example in which a field used to indicate index indication information is four bits is used. In this case, there are 16 corresponding MCS indexes, and the Pi/2 BPSK modulation mode may be indicated by using S idle MCS indexes. In addition, the terminal device first determines a corresponding TBS index based on an MCS index indicated by index indication information in the DCI and a first mapping relationship, and then determines, based on the TBS index and resource unit quantity indication information, the transport block size used for transmitting the uplink signal. In a second possible implementation, the terminal device first needs to determine a corresponding TBS index based on an MCS index indicated by index indication information in the DCI and a second mapping relationship, and then determines, based on the TBS index, resource unit quantity indication information, and carrier quantity indication information and/or modulation mode information, the transport block size TBS used for transmitting the uplink signal. In a third possible implementation, the terminal device may directly determine, based on index indication information in the DCI, the transport block size TBS used for transmitting the uplink signal, where there is a mapping relationship between the index indication information and the transport block size.

To describe the foregoing three possible implementations more clearly, the following describes the foregoing three possible implementations in detail by using specific embodiments.

In the first possible implementation, if the DCI received by the terminal device includes index indication information and resource unit quantity indication information, and the index indication information is used to indicate an MCS index, the terminal device may first determine a corresponding TBS index based on the MCS index indicated by the index indication information and a first mapping relationship, and then determine, based on the TBS index and the resource unit quantity indication information, the transport block size used for transmitting the uplink signal.

The first mapping relationship is used to indicate a relationship between an MCS index, a modulation mode, and a TBS index. Optionally, the first mapping relationship may include a first part and a second part. The first part is used to indicate a relationship between an MCS index, a QPSK modulation mode, and a TBS index, and the second part is used to indicate a relationship between a TBS index, the Pi/2 BPSK modulation mode, and a TBS index. Further, the second part may include S TBS indexes, and/or a maximum value of a transport block size in the second part is 936 or 1000. Therefore, a maximum quantity of transport blocks that can be supported by the two contiguous uplink subcarriers is 936 or 1000.

Optionally, the S TBS indexes in the second part are S TBS indexes in the first part. It should be noted that a transport block size corresponding to a TBS index in the first part and the resource unit quantity indication information is preset.

When the transport block size used for transmitting the uplink signal is determined based on a TBS index in the second part, the S TBS indexes in the second part need to be first determined. Optionally, the S TBS indexes may be any S TBS indexes in the first part. After the TBS index in the second part is determined, the transport block size in the second part is determined accordingly.

Similarly, an example in which a field used to indicate index indication information includes four bits is used. In this case, there are 16 corresponding MCS indexes. An existing standard specifies a relationship between QPSK modulation modes and TBS indexes corresponding to 11 MCS indexes, that is, MCS indexes 0 to 10. In this embodiment of this application, S unused MCS indexes may be set to S indexes corresponding to the Pi/2 BPSK modulation mode, where S is a positive integer, and S is greater than 2 and less than or equal to 5. It should be noted that, if the first part includes the first 11 MCS indexes in the 16 MCS indexes (that is, MCS indexes 0 to 10), the S unused MCS indexes may be the last S MCS indexes in the 16 MCS indexes, that is, MCS indexes 11 to (11+S−1). Certainly, if the first part includes the last 11 MCS indexes in the 16 MCS indexes (that is, MCS indexes 5 to 15), the S unused MCS indexes may be the first S MCS indexes in the 16 MCS indexes, that is, MCS indexes (0+5−S) to 4.

Optionally, the TBS index in the second part may be any one of TBS indexes 0 to 11 in the first part. However, for even distribution, TBS indexes in the first part may be selected at an equal interval to serve as TBS indexes corresponding to MCS indexes in the second part. Certainly, TBS indexes in the first part may alternatively be selected at an unequal interval to serve as TBS indexes corresponding to MCS indexes in the second part. The following specifically describes how to determine the S TBS indexes in the second part.

In a first case, when the first part includes the MCS indexes 0 to 10, the second part includes the MCS indexes 11 to (11+S−1). When S=3, refer to Table 1.

TABLE 1

| MCS index | Modulation mode | TBS index |
|---|---|---|
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |
| 6 | QPSK | 6 |
| 7 | QPSK | 7 |
| 8 | QPSK | 8 |
| 9 | QPSK | 9 |
| 10 | QPSK | 10 |
| 11 | Pi/2 BPSK | 1 |
| 12 | Pi/2 BPSK | 5 |
| 13 | Pi/2 BPSK | 9 |
| 14 | | |
| 15 | | |

It can be learned from Table 1 that the MCS indexes 0 to 10 in the first part all correspond to the QPSK mode, and the MCS indexes 0 to 10 are in a one-to-one correspondence with the TBS indexes 0 to 10. The MCS indexes 11 to 13 in the second part all correspond to the Pi/2 BPSK mode. In the first part, the MCS index 11 corresponds to the TBS index 1, the MCS index 12 corresponds to the TBS index 5, and the MCS index 13 corresponds to the TBS index 9.

Certainly, in the second part, the MCS index 11 may alternatively correspond to the TBS index 2, the MCS index 12 corresponds to the TBS index 6, and the MCS index 13 corresponds to the TBS index 10. Refer to Table 2.

TABLE 2

| MCS index | Modulation mode | TBS index |
|---|---|---|
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |
| 6 | QPSK | 6 |
| 7 | QPSK | 7 |
| 8 | QPSK | 8 |
| 9 | QPSK | 9 |
| 10 | QPSK | 10 |
| 11 | Pi/2 BPSK | 2 |
| 12 | Pi/2 BPSK | 6 |
| 13 | Pi/2 BPSK | 10 |
| 14 | | |
| 15 | | |

In addition, in the second part, the MCS index 11 may alternatively correspond to the TBS index 0, the MCS index 12 corresponds to the TBS index 5, and the MCS index 13 corresponds to the TBS index 9. Refer to Table 3.

TABLE 3

| MCS index | Modulation mode | TBS index |
|---|---|---|
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |
| 6 | QPSK | 6 |
| 7 | QPSK | 7 |
| 8 | QPSK | 8 |
| 9 | QPSK | 9 |
| 10 | QPSK | 10 |
| 11 | Pi/2 BPSK | 0 |
| 12 | Pi/2 BPSK | 5 |
| 13 | Pi/2 BPSK | 9 |
| 14 | | |
| 15 | | |

In a second case, when the first part includes the MCS indexes 5 to 15, the second part includes the MCS indexes 2 to 4. Refer to Table 4.

TABLE 4

| MCS index | Modulation mode | TBS index |
|---|---|---|
| 0 | | |
| 1 | | |
| 2 | Pi/2 BPSK | 1 |
| 3 | Pi/2 BPSK | 5 |
| 4 | Pi/2 BPSK | 9 |
| 5 | QPSK | 0 |
| 6 | QPSK | 1 |
| 7 | QPSK | 2 |
| 8 | QPSK | 3 |
| 9 | QPSK | 4 |
| 10 | QPSK | 5 |
| 11 | QPSK | 6 |
| 12 | QPSK | 7 |
| 13 | QPSK | 8 |
| 14 | QPSK | 9 |
| 15 | QPSK | 10 |

It can be learned from Table 4 that the MCS indexes 5 to 15 in the first part all correspond to the QPSK mode, and the MCS indexes 5 to 15 are in a one-to-one correspondence with the TBS indexes 0 to 10. The MCS indexes 0 to 4 in the second part all correspond to the Pi/2 BPSK mode. In the second part, the MCS index 2 corresponds to the TBS index 1, the MCS index 3 corresponds to the TBS index 5, and the MCS index 4 corresponds to the TBS index 9.

Certainly, in the second part, the MCS index 2 may alternatively correspond to the TBS index 2, the MCS index 3 corresponds to the TBS index 6, and the MCS index 4 corresponds to the TBS index 10. Refer to Table 5.

TABLE 5

| MCS index | Modulation mode | TBS index |
|---|---|---|
| 0 | | |
| 1 | | |
| 2 | Pi/2 BPSK | 2 |
| 3 | Pi/2 BPSK | 6 |
| 4 | Pi/2 BPSK | 10 |
| 5 | QPSK | 0 |
| 6 | QPSK | 1 |
| 7 | QPSK | 2 |
| 8 | QPSK | 3 |
| 9 | QPSK | 4 |
| 10 | QPSK | 5 |
| 11 | QPSK | 6 |
| 12 | QPSK | 7 |
| 13 | QPSK | 8 |
| 14 | QPSK | 9 |
| 15 | QPSK | 10 |

In addition, in the second part, the MCS index 2 may alternatively correspond to the TBS index 0, the MCS index 3 corresponds to the TBS index 5, and the MCS index 4 corresponds to the TBS index 9. Refer to Table 6.

TABLE 6

| MCS index | Modulation mode | TBS index |
|---|---|---|
| 0 | | |
| 1 | | |
| 2 | Pi/2 BPSK | 0 |
| 3 | Pi/2 BPSK | 5 |
| 4 | Pi/2 BPSK | 9 |
| 5 | QPSK | 0 |
| 6 | QPSK | 1 |
| 7 | QPSK | 2 |
| 8 | QPSK | 3 |
| 9 | QPSK | 4 |
| 10 | QPSK | 5 |
| 11 | QPSK | 6 |
| 12 | QPSK | 7 |
| 13 | QPSK | 8 |
| 14 | QPSK | 9 |
| 15 | QPSK | 10 |

Certainly, S may alternatively be equal to 4. When S is equal to 4, refer to Table 7.

TABLE 7

| MCS index | Modulation mode | TBS index |
|---|---|---|
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |
| 6 | QPSK | 6 |
| 7 | QPSK | 7 |
| 8 | QPSK | 8 |
| 9 | QPSK | 9 |

TABLE 7-continued

| MCS index | Modulation mode | TBS index |
|---|---|---|
| 10 | QPSK | 10 |
| 11 | Pi/2 BPSK | 1 |
| 12 | Pi/2 BPSK | 4 |
| 13 | Pi/2 BPSK | 7 |
| 14 | Pi/2 BPSK | 10 |
| 15 | | |

It can be learned from Table 7 that the MCS indexes 0 to 10 in the first part all correspond to the QPSK mode, and the MCS indexes 0 to 10 are in a one-to-one correspondence with the TBS indexes 0 to 10. The MCS indexes 11 to 14 in the second part all correspond to the Pi/2 BPSK mode. In the first part, the MCS index 11 corresponds to the TBS index 1, the MCS index 12 corresponds to the TBS index 4, the MCS index 13 corresponds to the TBS index 7, and the MCS index 14 corresponds to the TBS index 10.

Certainly, in the first part, the MCS index 11 may alternatively correspond to the TBS index 0, the MCS index 12 corresponds to the TBS index 3, the MCS index 13 corresponds to the TBS index 6, and the MCS index 14 corresponds to the TBS index 9. Refer to Table 8.

TABLE 8

| MCS index | Modulation mode | TBS index |
|---|---|---|
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |
| 6 | QPSK | 6 |
| 7 | QPSK | 7 |
| 8 | QPSK | 8 |
| 9 | QPSK | 9 |
| 10 | QPSK | 10 |
| 11 | Pi/2 BPSK | 0 |
| 12 | Pi/2 BPSK | 3 |
| 13 | Pi/2 BPSK | 6 |
| 14 | Pi/2 BPSK | 9 |
| 15 | | |

In addition, in the first part, the MCS index 11 may alternatively correspond to the TBS index 2, the MCS index 12 corresponds to the TBS index 4, the MCS index 13 corresponds to the TBS index 6, and the MCS index 14 corresponds to the TBS index 8. Refer to Table 9.

TABLE 9

| MCS index | Modulation mode | TBS index |
|---|---|---|
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |
| 6 | QPSK | 6 |
| 7 | QPSK | 7 |
| 8 | QPSK | 8 |
| 9 | QPSK | 9 |
| 10 | QPSK | 10 |
| 11 | Pi/2 BPSK | 2 |
| 12 | Pi/2 BPSK | 4 |
| 13 | Pi/2 BPSK | 6 |
| 14 | Pi/2 BPSK | 8 |
| 15 | | |

In the second case, when the first part includes the MCS indexes 5 to 15, the second part includes the MCS indexes 1 to 4. Refer to Table 10.

TABLE 10

| MCS index | Modulation mode | TBS index |
|---|---|---|
| 0 | | |
| 1 | Pi/2 BPSK | 1 |
| 2 | Pi/2 BPSK | 4 |
| 3 | Pi/2 BPSK | 7 |
| 4 | Pi/2 BPSK | 10 |
| 5 | QPSK | 0 |
| 6 | QPSK | 1 |
| 7 | QPSK | 2 |
| 8 | QPSK | 3 |
| 9 | QPSK | 4 |
| 10 | QPSK | 5 |
| 11 | QPSK | 6 |
| 12 | QPSK | 7 |
| 13 | QPSK | 8 |
| 14 | QPSK | 9 |
| 15 | QPSK | 10 |

It can be learned from Table 10 that the MCS indexes 5 to 15 in the first part all correspond to the QPSK mode, and the MCS indexes 5 to 15 are in a one-to-one correspondence with the TBS indexes 0 to 10. The MCS indexes 1 to 4 in the second part all correspond to the Pi/2 BPSK mode. In the second part, the MCS index 1 corresponds to the TBS index 1, the MCS index 2 corresponds to the TBS index 4, the MCS index 3 corresponds to the TBS index 7, and the MCS index 4 corresponds to the TBS index 10.

Certainly, in the second part, the MCS index 1 may alternatively correspond to the TBS index 0, the MCS index 2 corresponds to the TBS index 3, the MCS index 3 corresponds to the TBS index 6, and the MCS index 4 corresponds to the TBS index 9. Refer to Table 11.

TABLE 11

| MCS index | Modulation mode | TBS index |
|---|---|---|
| 0 | | |
| 1 | Pi/2 BPSK | 0 |
| 2 | Pi/2 BPSK | 3 |
| 3 | Pi/2 BPSK | 6 |
| 4 | Pi/2 BPSK | 9 |
| 5 | QPSK | 0 |
| 6 | QPSK | 1 |
| 7 | QPSK | 2 |
| 8 | QPSK | 3 |
| 9 | QPSK | 4 |
| 10 | QPSK | 5 |
| 11 | QPSK | 6 |
| 12 | QPSK | 7 |
| 13 | QPSK | 8 |
| 14 | QPSK | 9 |
| 15 | QPSK | 10 |

In addition, in the second part, the MCS index 1 may alternatively correspond to the TBS index 2, the MCS index 2 corresponds to the TBS index 4, the MCS index 3 corresponds to the TBS index 6, and the MCS index 4 corresponds to the TBS index 8. Refer to Table 12.

TABLE 12

| MCS index | Modulation mode | TBS index |
|---|---|---|
| 0 | | |
| 1 | Pi/2 BPSK | 2 |
| 2 | Pi/2 BPSK | 4 |
| 3 | Pi/2 BPSK | 6 |
| 4 | Pi/2 BPSK | 8 |
| 5 | QPSK | 0 |
| 6 | QPSK | 1 |
| 7 | QPSK | 2 |
| 8 | QPSK | 3 |
| 9 | QPSK | 4 |
| 10 | QPSK | 5 |
| 11 | QPSK | 6 |
| 12 | QPSK | 7 |
| 13 | QPSK | 8 |
| 14 | QPSK | 9 |
| 15 | QPSK | 10 |

Certainly, S may alternatively be equal to 5. When S is equal to 5, refer to Table 13.

TABLE 13

| MCS index | Modulation mode | TBS index |
|---|---|---|
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |
| 6 | QPSK | 6 |
| 7 | QPSK | 7 |
| 8 | QPSK | 8 |
| 9 | QPSK | 9 |
| 10 | QPSK | 10 |
| 11 | Pi/2 BPSK | 1 |
| 12 | Pi/2 BPSK | 3 |
| 13 | Pi/2 BPSK | 5 |
| 14 | Pi/2 BPSK | 7 |
| 15 | Pi/2 BPSK | 9 |

It can be learned from Table 13 that the MCS indexes 0 to 10 in the first part all correspond to the QPSK mode, and the MCS indexes 0 to 10 are in a one-to-one correspondence with the TBS indexes 0 to 10. The MCS indexes 11 to 15 in the second part all correspond to the Pi/2 BPSK mode. In the second part, the MCS index 11 corresponds to the TBS index 1, the MCS index 12 corresponds to the TBS index 3, the MCS index 13 corresponds to the TBS index 5, the MCS index 14 corresponds to the TBS index 7, and the MCS index 15 corresponds to the TBS index 9.

Certainly, in the second part, the MCS index 11 may alternatively correspond to the TBS index 2, the MCS index 12 corresponds to the TBS index 4, the MCS index 13 corresponds to the TBS index 6, the MCS index 14 corresponds to the TBS index 8, and the MCS index 15 corresponds to the TBS index 10. Refer to Table 14.

TABLE 14

| MCS index | Modulation mode | TBS index |
|---|---|---|
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |
| 6 | QPSK | 6 |
| 7 | QPSK | 7 |
| 8 | QPSK | 8 |
| 9 | QPSK | 9 |
| 10 | QPSK | 10 |
| 11 | Pi/2 BPSK | 2 |

TABLE 14-continued

| MCS index | Modulation mode | TBS index |
| --- | --- | --- |
| 12 | Pi/2 BPSK | 4 |
| 13 | Pi/2 BPSK | 6 |
| 14 | Pi/2 BPSK | 8 |
| 15 | Pi/2 BPSK | 10 |

In addition, in the second part, the MCS index 11 may alternatively correspond to the TBS index 0, the MCS index 12 corresponds to the TBS index 2, the MCS index 13 corresponds to the TBS index 5, the MCS index 14 corresponds to the TBS index 7, and the MCS index 15 corresponds to the TBS index 9. Refer to Table 15.

TABLE 15

| MCS index | Modulation mode | TBS index |
| --- | --- | --- |
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |
| 6 | QPSK | 6 |
| 7 | QPSK | 7 |
| 8 | QPSK | 8 |
| 9 | QPSK | 9 |
| 10 | QPSK | 10 |
| 11 | Pi/2 BPSK | 0 |
| 12 | Pi/2 BPSK | 2 |
| 13 | Pi/2 BPSK | 5 |
| 14 | Pi/2 BPSK | 7 |
| 15 | Pi/2 BPSK | 9 |

In the second case, when the first part includes the MCS indexes 5 to 15, the second part includes the MCS indexes 0 to 4. Refer to Table 16.

TABLE 16

| MCS index | Modulation mode | TBS index |
| --- | --- | --- |
| 0 | Pi/2 BPSK | 1 |
| 1 | Pi/2 BPSK | 3 |
| 2 | Pi/2 BPSK | 5 |
| 3 | Pi/2 BPSK | 7 |
| 4 | Pi/2 BPSK | 9 |
| 5 | QPSK | 0 |
| 6 | QPSK | 1 |
| 7 | QPSK | 2 |
| 8 | QPSK | 3 |
| 9 | QPSK | 4 |
| 10 | QPSK | 5 |
| 11 | QPSK | 6 |
| 12 | QPSK | 7 |
| 13 | QPSK | 8 |
| 14 | QPSK | 9 |
| 15 | QPSK | 10 |

It can be learned from Table 14 that the MCS indexes 5 to 15 in the first part all correspond to the QPSK mode, and the MCS indexes 5 to 15 are in a one-to-one correspondence with the TBS indexes 0 to 10. In the second part, the MCS index 0 corresponds to the TBS index 1, the MCS index 1 corresponds to the TBS index 3, the MCS index 2 corresponds to the TBS index 5, the MCS index 3 corresponds to the TBS index 7, and the MCS index 4 corresponds to the TBS index 9.

Certainly, in the second part, the MCS index 0 may alternatively correspond to the TBS index 2, the MCS index 1 corresponds to the TBS index 4, the MCS index 2 corresponds to the TBS index 6, the MCS index 3 corresponds to the TBS index 8, and the MCS index 4 corresponds to the TBS index 10. Refer to Table 17.

TABLE 17

| MCS index | Modulation mode | TBS index |
| --- | --- | --- |
| 0 | Pi/2 BPSK | 2 |
| 1 | Pi/2 BPSK | 4 |
| 2 | Pi/2 BPSK | 6 |
| 3 | Pi/2 BPSK | 8 |
| 4 | Pi/2 BPSK | 10 |
| 5 | QPSK | 0 |
| 6 | QPSK | 1 |
| 7 | QPSK | 2 |
| 8 | QPSK | 3 |
| 9 | QPSK | 4 |
| 10 | QPSK | 5 |
| 11 | QPSK | 6 |
| 12 | QPSK | 7 |
| 13 | QPSK | 8 |
| 14 | QPSK | 9 |
| 15 | QPSK | 10 |

In addition, in the second part, the MCS index 0 may alternatively correspond to the TBS index 0, the MCS index 1 corresponds to the TBS index 2, the MCS index 2 corresponds to the TBS index 5, the MCS index 3 corresponds to the TBS index 7, and the MCS index 4 corresponds to the TBS index 9. Refer to Table 18.

TABLE 18

| MCS index | Modulation mode | TBS index |
| --- | --- | --- |
| 0 | Pi/2 BPSK | 0 |
| 1 | Pi/2 BPSK | 2 |
| 2 | Pi/2 BPSK | 5 |
| 3 | Pi/2 BPSK | 7 |
| 4 | Pi/2 BPSK | 9 |
| 5 | QPSK | 0 |
| 6 | QPSK | 1 |
| 7 | QPSK | 2 |
| 8 | QPSK | 3 |
| 9 | QPSK | 4 |
| 10 | QPSK | 5 |
| 11 | QPSK | 6 |
| 12 | QPSK | 7 |
| 13 | QPSK | 8 |
| 14 | QPSK | 9 |
| 15 | QPSK | 10 |

It should be noted that an example in which the MCS indexes in Table 1 to Table 18 start only from 0 is used for description. Certainly, the MCS indexes may alternatively start from 1. This may be specifically set according to an actual requirement, provided that all possible combinations of modulation modes and TBS indexes in the foregoing tables can be found based on the MCS indexes. Certainly, the network device, the terminal device, a chip, and an apparatus may alternatively present the foregoing tables in a form of a set. To be specific, combinations of modulation modes and TBS indexes corresponding to all the MCS indexes in the foregoing tables constitute one set, and the set is searched for a specific combination of a modulation mode and a TBS index by using an MCS index.

In conclusion, after the TBS index corresponding to the MCS index in the second part is determined by using the foregoing tables, the corresponding transport block size may be determined based on the TBS index and the quantity of resource units. Optionally, when the corresponding transport block size is determined based on the TBS index and the quantity of resource units, and the MCS index indicated by the index indication information belongs to the first part and a quantity of resource units is N, the terminal device determines the TBS based on a column corresponding to a $K^{th}$ physical resource block (PRB) in a TBS table that is set in an existing standard and the TBS index indicated by the index indication information. In other words, the TBS is determined based on the column corresponding to the $K^{th}$ physical resource block (PRB) in the TBS table that is set in the existing standard and the TBS index indicated by the index indication information. When the MCS index indicated by the index indication information belongs to the second part and a quantity of resource units is 2×N, the terminal device determines the TBS based on a column corresponding to a $K^{th}$ physical resource block (PRB) in a TBS table that is set in an existing standard and the TBS index indicated by the index indication information. In other words, the TBS is determined based on the column corresponding to the $K^{th}$ physical resource block (PRB) in the TBS table that is set in the existing standard and the TBS index indicated by the index indication information, where N and K are positive integers.

For example, in the QPSK modulation mode, the quantity N of resource units may be 1 or 2. If the quantity of resource units is 1, Table 19 is queried based on the TBS index in the first part and a column corresponding to a third PRB in the TBS table, to determine the transport block size. If the quantity of resource units is 2, Table 19 is queried based on the TBS index in the first part and a column corresponding to a sixth PRB in the TBS table, to determine the transport block size. In the Pi/2 BPSK modulation mode, the quantity of resource units is 2 or 4. If the quantity of resource units is 2, Table 19 is queried based on the TBS index in the second part and a column corresponding to a third PRB in the TBS table, to determine the transport block size. If the quantity of resource units is 4, Table 19 is queried based on the TBS index in the second part and a column corresponding to a sixth PRB in the TBS table, to determine the transport block size used for transmitting the uplink signal. Refer to Table 19.

TABLE 19

| TBS index | Quantity of physical resource blocks | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |

TABLE 19-continued

| TBS index | Quantity of physical resource blocks | | | | | | | | | |
|---|---|---|---|---|---|---|---|---|---|---|
| | 1 | 2 | 3 | 4 | 5 | 6 | 7 | 8 | 9 | 10 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |
| 26A | 632 | 1288 | 1928 | 2600 | 3240 | 3880 | 4584 | 5160 | 5992 | 6456 |

It can be learned that, in this possible implementation, before sending the uplink signal based on the determined transport block size, the terminal device receives the DCI sent by the network device, and the DCI includes the index indication information and the resource unit quantity indication information. Therefore, the terminal device may first determine the corresponding TBS index based on the MCS index indicated by the index indication information and the first mapping relationship, then determine, based on the TBS index and the resource unit quantity indication information, the transport block size used for transmitting the uplink signal, and sends the uplink signal on the two contiguous uplink subcarriers in the Pi/2 BPSK modulation mode based on the determined transport block size after determining the transport block size, so as to complete transmission of the uplink signal in the Pi/2 BPSK modulation mode by using the determined transport block size. Correspondingly, the network device may demodulate, in the Pi/2 BPSK modulation mode, the uplink signal received on the two contiguous uplink subcarriers, so as to receive the uplink signal in the Pi/2 BPSK modulation mode.

It should be noted that, in this embodiment of this application, if the index indication information is used to indicate the MCS index, after the MCS index is obtained based on the index indication information, the method may further include:

determining, based on the MCS index, a quantity of carriers that are allocated by the network device to the terminal device for transmitting uplink information, where the quantity of carriers is 2 or 3/6.

The existing standard supports resource scheduling of six contiguous subcarriers, three contiguous subcarriers, or two contiguous subcarriers in one physical resource block PRB. In addition, during resource scheduling of two subcarriers, the two subcarriers are two of three contiguous scheduled subcarriers. In other words, resource scheduling of two subcarriers is the same as resource scheduling of three subcarriers. Therefore, the terminal device needs to learn whether to perform scheduling of two subcarriers or scheduling of three subcarriers. In this embodiment of this application, because resource scheduling corresponding to the QPSK modulation mode is scheduling of three subcarriers and scheduling of six subcarriers, resource scheduling corresponding to the pi/2 BPSK modulation mode is scheduling of two subcarriers, and there is a mapping relationship between an MCS index and each of the QPSK modulation mode and the pi/2 BPSK modulation mode, the pi/2 BPSK modulation mode may be determined based on the MCS index, and therefore scheduling of two subcarriers is determined, so that scheduling of two subcarriers and scheduling of three subcarriers can be distinguished.

In the second possible implementation, the terminal device first needs to determine the corresponding TBS index based on the MCS index indicated by the index indication information in the DCI and the second mapping relationship, and then determines, based on the TBS index, the resource unit quantity indication information, and the carrier quantity indication information and/or the modulation mode information, the transport block size TBS used for transmitting the uplink signal.

The second mapping relationship is used to indicate a relationship between an MCS index and a TBS index.

In this possible implementation, a same TBS table is used in the Pi/2 BPSK modulation mode and the QPSK modulation mode. Therefore, before the transport block size is determined, a modulation mode to be used by the terminal device needs to be obtained in advance, and the modulation mode may be obtained by using the carrier quantity indication information and/or the modulation mode information. When the modulation mode is determined by using the carrier quantity indication information, if the carrier quantity indication information indicates that a quantity of carriers is 2, it is determined that the modulation mode is the pi/2 BPSK modulation mode; or if the carrier quantity indication information indicates that a quantity of carriers is 3 or 6, it is determined that the modulation mode is the QPSK modulation mode. Certainly, if the modulation mode is determined by using the modulation mode information, the modulation mode may be an identifier of the QPSK modulation mode or the pi/2 BPSK modulation mode. Certainly, the modulation mode to be used by the terminal device may be alternatively determined in another manner.

Similarly, an example in which a field used to indicate the index indication information includes four bits is used. In this case, there are 16 corresponding MCS indexes. The existing standard specifies a relationship between QPSK modulation modes and TBS indexes corresponding to 11 MCS indexes. When a TBS index corresponding to an MCS index in the Pi/2 BPSK modulation mode is determined, referring to Table 20, a same TBS table is used in the Pi/2 BPSK modulation mode and the QPSK modulation mode.

TABLE 20

| MCS index | TBS index |
| --- | --- |
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |

It can be learned from Table 20 that, when the modulation mode is the Pi/2 BPSK modulation mode, MCS indexes corresponding to the Pi/2 BPSK modulation mode are also in a one-to-one correspondence with TBS indexes corresponding to the Pi/2 BPSK modulation mode, so that a TBS index corresponding to an MCS index in the Pi/2 BPSK modulation mode can be determined based on the second mapping relationship in Table 20. After the TBS index is determined, the transport block size TBS used for transmitting the uplink signal may be determined based on the TBS index, the Pi/2 BPSK modulation mode, and the quantity of resource units indicated by the resource unit indication information.

Optionally, when the modulation mode is the QPSK modulation mode, and the quantity of resource units indicated by the resource unit quantity indication information is P, the terminal device determines, based on a column corresponding to an $M^{th}$ resource unit in a TBS table that is set in a standard and the TBS index corresponding to the index indication information, the transport block size TBS used for transmitting the uplink signal.

When the modulation mode is the Pi/2 BPSK modulation mode, and the quantity of resource units indicated by the resource unit quantity indication information is 2×P, the terminal device determines, based on a column corresponding to an $M^{th}$ resource unit in a TBS table that is set in a standard and the TBS index corresponding to the index indication information, the transport block size TBS used for transmitting the uplink signal, where M and P are positive integers.

For example, with reference to Table 19, in the QPSK modulation mode, the quantity N of resource units may be 1 or 2. If the quantity of resource units is 1, Table 7 is queried based on the TBS index and a column corresponding to a third PRB in the TBS table, to determine the transport block size. If the quantity of resource units is 2, Table 19 is queried based on the TBS index and a column corresponding to a sixth PRB in the TBS table, to determine the transport block size. In the Pi/2 BPSK modulation mode, the quantity of resource units is 2 or 4. If the quantity of resource units is 2, Table 19 is queried based on the TBS index and a column corresponding to a third PRB in the TBS table, to determine the transport block size. If the quantity of resource units is 4, Table 19 is queried based on the TBS index and a column corresponding to a sixth PRB in the TBS table, to determine the transport block size used for transmitting the uplink signal. Referring to Table 21, optionally, the maximum value of the TBS is 936, 1000, or 1032. Therefore, a maximum quantity of transport blocks that can be supported by the two contiguous uplink subcarriers is 936 or 1000.

It should be noted that an example in which the MCS indexes in Table 20 start only from 0 is used for description. Certainly, the MCS indexes may alternatively start from 1. This may be specifically set according to an actual requirement, provided that corresponding TBS indexes can be found based on the MCS indexes. Certainly, the network device, the terminal device, a chip, and an apparatus may alternatively present the foregoing table in a form of a set. To be specific, the TBS indexes corresponding to all the MCS indexes in the foregoing table constitute one set, and the set is searched for a specific TBS index by using an MCS index.

It can be learned that, in this possible implementation, before sending the uplink signal based on the determined transport block size, the terminal device receives the DCI sent by the network device, and the DCI includes the carrier quantity indication information and/or the modulation mode information, the index indication information, and the resource unit quantity indication information. Therefore, the terminal device may determine the corresponding TBS index based on the MCS index indicated by the index indication information and the second mapping relationship, determine the modulation mode based on the carrier quantity indication information and/or the modulation mode information, then determine, based on the TBS index, the modulation mode, and the resource unit quantity indication information, the transport block size used for transmitting the uplink signal, and send the uplink signal on the two contiguous uplink subcarriers in the Pi/2 BPSK modulation mode based on the determined transport block size after determining the transport block size, so as to complete transmission of the uplink signal in the Pi/2 BPSK modulation mode by using the determined transport block size. Correspondingly, the network device may demodulate, in the Pi/2 BPSK modulation mode, the uplink signal received on the two contiguous uplink subcarriers, so as to receive the uplink signal in the Pi/2 BPSK modulation mode.

In the third possible implementation, the terminal device directly determines, based on the index indication information in the DCI, the transport block size TBS used for transmitting the uplink signal, where there is the mapping relationship between the index indication information and the transport block size.

The DCI includes the index indication information, and there is the mapping relationship between the index indication information and the transport block size.

An example in which a field used to indicate the index indication information is four bits is used. In this case, a maximum of 16 pieces of index indication information can be supported. As shown in Table 21, there are a total of 22 transport block sizes in the second column in Table 21. Two transport block sizes each are 208, two transport block sizes each are 256, two transport block sizes each are 328, two transport block sizes each are 504, and the like. Either of two equal transport block sizes may be deleted. In other words, only one of two equal numbers in each group is retained. In this case, there are still 17 remaining transport block sizes, and one of the 17 remaining transport block sizes further needs to be deleted. For example, in this embodiment of this application, deletion may be performed based on a proximity degree between transport block sizes. In this embodiment of this application, 144 or 152 may be deleted because 144 and 152 are relatively close, or 408 or 392 may be deleted because 408 and 392 are relatively close. Therefore, there are 16 remaining transport block sizes. The mapping relationship between the index indication information and the transport block size may be applied to the Pi/2 BPSK modulation mode. For example, the index indication information may be used to indicate an index. When 16 transport block sizes corresponding to 16 indexes are determined, 408 may be deleted. Refer to Table 22.

TABLE 21

| TBS index | Quantity of physical resource blocks | |
|---|---|---|
| | 3 | 6 |
| 0 | 56 | 152 |
| 1 | 88 | 208 |
| 2 | 144 | 256 |
| 3 | 176 | 328 |
| 4 | 208 | 408 |
| 5 | 224 | 504 |
| 6 | 256 | 600 |
| 7 | 328 | 712 |
| 8 | 392 | 808 |
| 9 | 456 | 936 |
| 10 | 504 | 1000 or 1032 |

TABLE 22

| Index | Modulation mode | TBS |
|---|---|---|
| 0 | Pi/2 BPSK | 56 |
| 1 | Pi/2 BPSK | 88 |
| 2 | Pi/2 BPSK | 144 |
| 3 | Pi/2 BPSK | 152 |
| 4 | Pi/2 BPSK | 176 |
| 5 | Pi/2 BPSK | 208 |
| 6 | Pi/2 BPSK | 224 |
| 7 | Pi/2 BPSK | 256 |
| 8 | Pi/2 BPSK | 328 |
| 9 | Pi/2 BPSK | 392 |
| 10 | Pi/2 BPSK | 456 |

TABLE 22-continued

| Index | Modulation mode | TBS |
|---|---|---|
| 11 | Pi/2 BPSK | 504 |
| 12 | Pi/2 BPSK | 600 |
| 13 | Pi/2 BPSK | 712 |
| 14 | Pi/2 BPSK | 808 |
| 15 | Pi/2 BPSK | 936 |

It can be learned from Table 22 that, after 408 is deleted from the 17 values, there are 16 remaining transport block sizes. Because the indexes are in a one-to-one correspondence with the transport block sizes, the terminal device may directly determine, based on the index indication information, the transport block size used for transmitting the uplink signal.

Certainly, when the 16 transport block sizes corresponding to the 16 indexes are determined, 152 may be alternatively deleted. Refer to Table 23.

TABLE 23

| Index | Modulation mode | TBS |
|---|---|---|
| 0 | Pi/2 BPSK | 56 |
| 1 | Pi/2 BPSK | 88 |
| 2 | Pi/2 BPSK | 144 |
| 3 | Pi/2 BPSK | 176 |
| 4 | Pi/2 BPSK | 208 |
| 5 | Pi/2 BPSK | 224 |
| 6 | Pi/2 BPSK | 256 |
| 7 | Pi/2 BPSK | 328 |
| 8 | Pi/2 BPSK | 392 |
| 9 | Pi/2 BPSK | 408 |
| 10 | Pi/2 BPSK | 456 |
| 11 | Pi/2 BPSK | 504 |
| 12 | Pi/2 BPSK | 600 |
| 13 | Pi/2 BPSK | 712 |
| 14 | Pi/2 BPSK | 808 |
| 15 | Pi/2 BPSK | 936 |

It can be learned from Table 23 that, after 152 is deleted from the 17 values, there are 16 remaining transport block sizes. Because the indexes are in a one-to-one correspondence with the transport block sizes, the terminal device may directly determine, based on the index indication information, the transport block size used for transmitting the uplink signal.

In addition, when the 16 transport block sizes corresponding to the 16 indexes are determined, 144 may be alternatively deleted. Refer to Table 24.

TABLE 24

| Index | Modulation mode | TBS |
|---|---|---|
| 0 | Pi/2 BPSK | 56 |
| 1 | Pi/2 BPSK | 88 |
| 2 | Pi/2 BPSK | 152 |
| 3 | Pi/2 BPSK | 176 |
| 4 | Pi/2 BPSK | 208 |
| 5 | Pi/2 BPSK | 224 |
| 6 | Pi/2 BPSK | 256 |
| 7 | Pi/2 BPSK | 328 |
| 8 | Pi/2 BPSK | 392 |
| 9 | Pi/2 BPSK | 408 |
| 10 | Pi/2 BPSK | 456 |
| 11 | Pi/2 BPSK | 504 |
| 12 | Pi/2 BPSK | 600 |
| 13 | Pi/2 BPSK | 712 |
| 14 | Pi/2 BPSK | 808 |
| 15 | Pi/2 BPSK | 936 |

It can be learned from Table 24 that, after 144 is deleted from the 17 values, there are 16 remaining transport block sizes. Because the indexes are in a one-to-one correspondence with the transport block sizes, the terminal device may directly determine, based on the index indication information, the transport block size used for transmitting the uplink signal.

Optionally, the field used to indicate the index indication information may be a field used to indicate an MCS index in DCI Format 6-0B or DCI Format 6-0A in the existing standard.

It should be noted that an example in which the indexes in Table 22 to Table 24 start only from 0 is used for description. Certainly, the indexes may alternatively start from 1. This may be specifically set according to an actual requirement, provided that the transport block sizes in the foregoing tables can be found based on the indexes. Certainly, the network device, the terminal device, a chip, and an apparatus may alternatively present the foregoing tables in a form of a set. To be specific, the TBSs corresponding to all the indexes in the foregoing tables constitute one set, and the set is searched for a specific TBS by using an index.

It can be learned that, in this possible implementation, before sending the uplink signal based on the determined transport block size, the terminal device receives the DCI sent by the network device, and the DCI includes the index indication information. Therefore, the terminal device may directly determine, based on the index indication information, the transport block size used for transmitting the uplink signal, and send the uplink signal on the two contiguous uplink subcarriers in the Pi/2 BPSK modulation mode based on the determined transport block size after determining the transport block size, so as to complete transmission of the uplink signal in the Pi/2 BPSK modulation mode by using the determined transport block size. Correspondingly, the network device may demodulate, in the Pi/2 BPSK modulation mode, the uplink signal received on the two contiguous uplink subcarriers, so as to receive the uplink signal in the Pi/2 BPSK modulation mode.

In addition, it should be noted that, after obtaining the index indicated by the index indication information, the terminal device may further determine a quantity of resource units based on the index.

For example, in a first case, an example in which 408 is deleted is used. In a possible manner, four resource unit quantity types are supported, and the four resource unit quantity types are respectively as follows: one resource unit, two resource units, three resource units, and four resource units. In this case, a relationship between an index and a quantity of resource units may be shown in Table 25.

TABLE 25

| Index | Modulation mode | TBS | Quantity of resource units |
|---|---|---|---|
| 0 | Pi/2 BPSK | 56 | 1 |
| 1 | Pi/2 BPSK | 88 | 1 |
| 2 | Pi/2 BPSK | 144 | 1 |
| 3 | Pi/2 BPSK | 152 | 1 |
| 4 | Pi/2 BPSK | 176 | 2 |
| 5 | Pi/2 BPSK | 208 | 2 |
| 6 | Pi/2 BPSK | 224 | 2 |
| 7 | Pi/2 BPSK | 256 | 2 |
| 8 | Pi/2 BPSK | 328 | 3 |
| 9 | Pi/2 BPSK | 392 | 3 |
| 10 | Pi/2 BPSK | 456 | 3 |
| 11 | Pi/2 BPSK | 504 | 3 |
| 12 | Pi/2 BPSK | 600 | 4 |
| 13 | Pi/2 BPSK | 712 | 4 |

TABLE 25-continued

| Index | Modulation mode | TBS | Quantity of resource units |
|---|---|---|---|
| 14 | Pi/2 BPSK | 808 | 4 |
| 15 | Pi/2 BPSK | 936 | 4 |

With reference to Table 25, when the four resource unit quantity types are supported, and there are 16 indexes and 16 corresponding transport block sizes, the 16 indexes and the 16 corresponding transport block sizes may evenly correspond to the four resource unit quantity types based on a type quantity and an index size. Certainly, alternatively, the 16 indexes and the 16 corresponding transport block sizes may unevenly correspond to the four resource unit quantity types based on an index size. Therefore, a corresponding quantity of resource units is directly determined based on an index. Certainly, in this embodiment of this application, Table 25 is merely used as an example for description, but this does not mean that this application is limited thereto.

In a possible manner, three resource unit quantity types are supported, and the three resource unit quantity types are respectively as follows: one resource unit, two resource units, and four resource units. In this case, a relationship between an index and a quantity of resource units may be shown in Table 26.

TABLE 26

| Index | Modulation mode | TBS | Quantity of resource units |
|---|---|---|---|
| 0 | Pi/2 BPSK | 56 | 1 |
| 1 | Pi/2 BPSK | 88 | 1 |
| 2 | Pi/2 BPSK | 144 | 1 |
| 3 | Pi/2 BPSK | 152 | 1 |
| 4 | Pi/2 BPSK | 176 | 1 |
| 5 | Pi/2 BPSK | 208 | 2 |
| 6 | Pi/2 BPSK | 224 | 2 |
| 7 | Pi/2 BPSK | 256 | 2 |
| 8 | Pi/2 BPSK | 328 | 2 |
| 9 | Pi/2 BPSK | 392 | 2 |
| 10 | Pi/2 BPSK | 456 | 4 |
| 11 | Pi/2 BPSK | 504 | 4 |
| 12 | Pi/2 BPSK | 600 | 4 |
| 13 | Pi/2 BPSK | 712 | 4 |
| 14 | Pi/2 BPSK | 808 | 4 |
| 15 | Pi/2 BPSK | 936 | 4 |

With reference to Table 26, when the three resource unit quantity types are supported in the standard, and there are 16 indexes and 16 corresponding transport block sizes, the 16 indexes and the 16 corresponding transport block sizes may correspond to the three resource unit quantity types based on a quantity of resource units and an index size. For example, indexes 1 to 4 each correspond to one resource unit, indexes 5 to 9 each correspond to two resource units, and indexes 10 to 15 each correspond to four resource units. Therefore, a corresponding quantity of resource units is directly determined based on an index. Certainly, the 16 indexes and the 16 corresponding transport block sizes may alternatively correspond to the three resource unit quantity types in another manner. In this embodiment of this application, Table 26 is merely used as an example for description, but this does not mean that this application is limited thereto.

In a possible manner, three resource unit quantity types are supported, and the three resource unit quantity types are respectively as follows: two resource units, three resource units, and four resource units. In this case, a relationship between an index and a quantity of resource units may be shown in Table 27.

TABLE 27

| Index | Modulation mode | TBS | Quantity of resource units |
|---|---|---|---|
| 0 | Pi/2 BPSK | 56 | 2 |
| 1 | Pi/2 BPSK | 88 | 2 |
| 2 | Pi/2 BPSK | 144 | 2 |
| 3 | Pi/2 BPSK | 152 | 2 |
| 4 | Pi/2 BPSK | 176 | 2 |
| 5 | Pi/2 BPSK | 208 | 3 |
| 6 | Pi/2 BPSK | 224 | 3 |
| 7 | Pi/2 BPSK | 256 | 3 |
| 8 | Pi/2 BPSK | 328 | 3 |
| 9 | Pi/2 BPSK | 392 | 3 |
| 10 | Pi/2 BPSK | 456 | 4 |
| 11 | Pi/2 BPSK | 504 | 4 |
| 12 | Pi/2 BPSK | 600 | 4 |
| 13 | Pi/2 BPSK | 712 | 4 |
| 14 | Pi/2 BPSK | 808 | 4 |
| 15 | Pi/2 BPSK | 936 | 4 |

With reference to Table 27, when the three resource unit quantity types are supported in the standard, and there are 16 indexes and 16 corresponding transport block sizes, the 16 indexes and the 16 corresponding transport block sizes may correspond to the three resource unit quantity types based on a type quantity and an index size. For example, indexes 1 to 4 each correspond to two resource units, indexes 5 to 9 each correspond to three resource units, and indexes 10 to 15 each correspond to four resource units. Therefore, a corresponding quantity of resource units is directly determined based on an index. Certainly, the 16 indexes and the 16 corresponding transport block sizes may alternatively correspond to the three resource unit quantity types in another manner. In this embodiment of this application, Table 27 is merely used as an example for description, but this does not mean that this application is limited thereto.

In a second case, an example in which 152 is deleted is used. In a possible manner, four resource unit quantity types are supported, and the four resource unit quantity types are respectively as follows: one resource unit, two resource units, three resource units, and four resource units. In this case, a relationship between an index and a quantity of resource units may be shown in Table 28.

TABLE 28

| Index | Modulation mode | TBS | Quantity of resource units |
|---|---|---|---|
| 0 | Pi/2 BPSK | 56 | 1 |
| 1 | Pi/2 BPSK | 88 | 1 |
| 2 | Pi/2 BPSK | 144 | 1 |
| 3 | Pi/2 BPSK | 176 | 1 |
| 4 | Pi/2 BPSK | 208 | 2 |
| 5 | Pi/2 BPSK | 224 | 2 |
| 6 | Pi/2 BPSK | 256 | 2 |
| 7 | Pi/2 BPSK | 328 | 2 |
| 8 | Pi/2 BPSK | 392 | 3 |
| 9 | Pi/2 BPSK | 408 | 3 |
| 10 | Pi/2 BPSK | 456 | 3 |
| 11 | Pi/2 BPSK | 504 | 3 |
| 12 | Pi/2 BPSK | 600 | 4 |
| 13 | Pi/2 BPSK | 712 | 4 |
| 14 | Pi/2 BPSK | 808 | 4 |
| 15 | Pi/2 BPSK | 936 | 4 |

With reference to Table 28, when the four resource unit quantity types are supported, and there are 16 indexes and 16 corresponding transport block sizes, the 16 indexes and the 16 corresponding transport block sizes may evenly correspond to the four resource unit quantity types based on a type quantity and an index size. Certainly, alternatively, the 16 indexes and the 16 corresponding transport block sizes may unevenly correspond to the four resource unit quantity types based on an index size. Therefore, a corresponding quantity of resource units is directly determined based on an index. Certainly, in this embodiment of this application, Table 28 is merely used as an example for description, but this does not mean that this application is limited thereto.

In a possible manner, three resource unit quantity types are supported in the standard, and the three resource unit quantity types are respectively as follows: two resource units, three resource units, and four resource units. In this case, a relationship between an index and a quantity of resource units may be shown in Table 29.

TABLE 29

| Index | Modulation mode | TBS | Quantity of resource units |
|---|---|---|---|
| 0 | Pi/2 BPSK | 56 | 2 |
| 1 | Pi/2 BPSK | 88 | 2 |
| 2 | Pi/2 BPSK | 144 | 2 |
| 3 | Pi/2 BPSK | 176 | 2 |
| 4 | Pi/2 BPSK | 208 | 2 |
| 5 | Pi/2 BPSK | 224 | 3 |
| 6 | Pi/2 BPSK | 256 | 3 |
| 7 | Pi/2 BPSK | 328 | 3 |
| 8 | Pi/2 BPSK | 392 | 3 |
| 9 | Pi/2 BPSK | 408 | 3 |
| 10 | Pi/2 BPSK | 456 | 4 |
| 11 | Pi/2 BPSK | 504 | 4 |
| 12 | Pi/2 BPSK | 600 | 4 |
| 13 | Pi/2 BPSK | 712 | 4 |
| 14 | Pi/2 BPSK | 808 | 4 |
| 15 | Pi/2 BPSK | 936 | 4 |

With reference to Table 29, when the three resource unit quantity types are supported in the standard, and there are 16 indexes and 16 corresponding transport block sizes, the 16 indexes and the 16 corresponding transport block sizes may correspond to the three resource unit quantity types based on a type quantity and an index size. For example, indexes 1 to 4 each correspond to two resource units, indexes 5 to 9 each correspond to three resource units, and indexes 10 to 15 each correspond to four resource units. Therefore, a corresponding quantity of resource units is directly determined based on an index. Certainly, the 16 indexes and the 16 corresponding transport block sizes may alternatively correspond to the three resource unit quantity types in another manner. In this embodiment of this application, Table 29 is merely used as an example for description, but this does not mean that this application is limited thereto.

In a possible manner, three resource unit quantity types are supported, and the three resource unit quantity types are respectively as follows: one resource unit, two resource units, and four resource units. In this case, a relationship between an index and a quantity of resource units may be shown in Table 30.

TABLE 30

| Index | Modulation mode | TBS | Quantity of resource units |
|---|---|---|---|
| 0 | Pi/2 BPSK | 56 | 1 |
| 1 | Pi/2 BPSK | 88 | 1 |
| 2 | Pi/2 BPSK | 144 | 1 |
| 3 | Pi/2 BPSK | 176 | 1 |
| 4 | Pi/2 BPSK | 208 | 1 |
| 5 | Pi/2 BPSK | 224 | 2 |
| 6 | Pi/2 BPSK | 256 | 2 |
| 7 | Pi/2 BPSK | 328 | 2 |
| 8 | Pi/2 BPSK | 392 | 2 |
| 9 | Pi/2 BPSK | 408 | 2 |
| 10 | Pi/2 BPSK | 456 | 4 |

TABLE 30-continued

| Index | Modulation mode | TBS | Quantity of resource units |
|---|---|---|---|
| 11 | Pi/2 BPSK | 504 | 4 |
| 12 | Pi/2 BPSK | 600 | 4 |
| 13 | Pi/2 BPSK | 712 | 4 |
| 14 | Pi/2 BPSK | 808 | 4 |
| 15 | Pi/2 BPSK | 936 | 4 |

With reference to Table 30, when the three resource unit quantity types are supported in the standard, and there are 16 indexes and 16 corresponding transport block sizes, the 16 indexes and the 16 corresponding transport block sizes may correspond to the three resource unit quantity types based on the resource unit quantity types and an index size. For example, indexes 1 to 4 each correspond to one resource unit, indexes 5 to 9 each correspond to one resource unit, and indexes 10 to 15 each correspond to four resource units. Therefore, a corresponding quantity of resource units is directly determined based on an index. Certainly, the 16 indexes and the 16 corresponding transport block sizes may alternatively correspond to the three resource unit quantity types in another manner. In this embodiment of this application, Table 30 is merely used as an example for description, but this does not mean that this application is limited thereto.

In a third case, an example in which 144 is deleted is used. In a possible manner, four resource unit quantity types are supported, and the four resource unit quantity types are respectively as follows: one resource unit, two resource units, three resource units, and four resource units. In this case, a relationship between an index and a quantity of resource units may be shown in Table 31.

TABLE 31

| Index | Modulation mode | TBS | Quantity of resource units |
|---|---|---|---|
| 0 | Pi/2 BPSK | 56 | 1 |
| 1 | Pi/2 BPSK | 88 | 1 |
| 2 | Pi/2 BPSK | 152 | 1 |
| 3 | Pi/2 BPSK | 176 | 1 |
| 4 | Pi/2 BPSK | 208 | 2 |
| 5 | Pi/2 BPSK | 224 | 2 |
| 6 | Pi/2 BPSK | 256 | 2 |
| 7 | Pi/2 BPSK | 328 | 2 |
| 8 | Pi/2 BPSK | 392 | 3 |
| 9 | Pi/2 BPSK | 408 | 3 |
| 10 | Pi/2 BPSK | 456 | 3 |
| 11 | Pi/2 BPSK | 504 | 3 |
| 12 | Pi/2 BPSK | 600 | 4 |
| 13 | Pi/2 BPSK | 712 | 4 |
| 14 | Pi/2 BPSK | 808 | 4 |
| 15 | Pi/2 BPSK | 936 | 4 |

With reference to Table 31, when the four resource unit quantity types are supported in the standard, and there are 16 indexes and 16 corresponding transport block sizes, the 16 indexes and the 16 corresponding transport block sizes may evenly correspond to the four resource unit quantity types based on the type quantity and an index size. Certainly, alternatively, the 16 indexes and the 16 corresponding transport block sizes may unevenly correspond to the four resource unit quantity types based on an index size. Therefore, a corresponding quantity of resource units is directly determined based on an index. Certainly, in this embodiment of this application, Table 31 is merely used as an example for description, but this does not mean that this application is limited thereto.

In a possible manner, three resource unit quantity types are supported, and the three resource unit quantity types are respectively as follows: two resource units, three resource units, and four resource units. In this case, a relationship between an index and a quantity of resource units may be shown in Table 32.

TABLE 32

| Index | Modulation mode | TBS | Quantity of resource units |
|---|---|---|---|
| 0 | Pi/2 BPSK | 56 | 2 |
| 1 | Pi/2 BPSK | 88 | 2 |
| 2 | Pi/2 BPSK | 152 | 2 |
| 3 | Pi/2 BPSK | 176 | 2 |
| 4 | Pi/2 BPSK | 208 | 2 |
| 5 | Pi/2 BPSK | 224 | 3 |
| 6 | Pi/2 BPSK | 256 | 3 |
| 7 | Pi/2 BPSK | 328 | 3 |
| 8 | Pi/2 BPSK | 392 | 3 |
| 9 | Pi/2 BPSK | 408 | 3 |
| 10 | Pi/2 BPSK | 456 | 4 |
| 11 | Pi/2 BPSK | 504 | 4 |
| 12 | Pi/2 BPSK | 600 | 4 |
| 13 | Pi/2 BPSK | 712 | 4 |
| 14 | Pi/2 BPSK | 808 | 4 |
| 15 | Pi/2 BPSK | 936 | 4 |

With reference to Table 32, when the three resource unit quantity types are supported, and there are 16 indexes and 16 corresponding transport block sizes, the 16 indexes and the 16 corresponding transport block sizes may correspond to the three resource unit quantity types based on a type quantity and an index size. For example, indexes 1 to 4 each correspond to two resource units, indexes 5 to 9 each correspond to three resource units, and indexes 10 to 15 each correspond to four resource units. Therefore, a corresponding quantity of resource units is directly determined based on an index. Certainly, the 16 indexes and the 16 corresponding transport block sizes may alternatively correspond to the three resource unit quantity types in another manner. In this embodiment of this application, Table 20 is merely used as an example for description, but this does not mean that this application is limited thereto.

In a possible manner, three resource unit quantity types are supported, and the three resource unit quantity types are respectively as follows: one resource unit, three resource units, and four resource units. In this case, a relationship between an index and a quantity of resource units may be shown in Table 33.

TABLE 33

| Index | Modulation mode | TBS | Quantity of resource units |
|---|---|---|---|
| 0 | Pi/2 BPSK | 56 | 1 |
| 1 | Pi/2 BPSK | 88 | 1 |
| 2 | Pi/2 BPSK | 152 | 1 |
| 3 | Pi/2 BPSK | 176 | 1 |
| 4 | Pi/2 BPSK | 208 | 1 |
| 5 | Pi/2 BPSK | 224 | 2 |
| 6 | Pi/2 BPSK | 256 | 2 |
| 7 | Pi/2 BPSK | 328 | 2 |
| 8 | Pi/2 BPSK | 392 | 2 |
| 9 | Pi/2 BPSK | 408 | 2 |
| 10 | Pi/2 BPSK | 456 | 4 |
| 11 | Pi/2 BPSK | 504 | 4 |
| 12 | Pi/2 BPSK | 600 | 4 |
| 13 | Pi/2 BPSK | 712 | 4 |
| 14 | Pi/2 BPSK | 808 | 4 |
| 15 | Pi/2 BPSK | 936 | 4 |

With reference to Table 33, when the three resource unit quantity types are supported, and there are 16 indexes and 16 corresponding transport block sizes, the 16 indexes and the 16 corresponding transport block sizes may correspond to the three resource unit quantity types based on a type quantity and an index size. For example, indexes 1 to 4 each correspond to one resource unit, indexes 5 to 9 each correspond to two resource units, and indexes 10 to 15 each correspond to four resource units. Therefore, a corresponding quantity of resource units is directly determined based on an index. Certainly, the 16 indexes and the 16 corresponding transport block sizes may alternatively correspond to the three resource unit quantity types in another manner. In this embodiment of this application, Table 33 is merely used as an example for description, but this does not mean that this application is limited thereto.

It should be noted that, because the indexes in Table 25 to Table 33 all correspond to the Pi/2 BPSK, a column of modulation mode may be not included in the tables, and table name description, text description, or another manner may be used to represent that the tables each correspond the Pi/2 BPSK.

It should also be noted that an example in which the indexes in Table 25 to Table 33 start only from 0 is used for description. Certainly, the indexes may alternatively start from 1. This may be specifically set according to an actual requirement, provided that the transport block sizes in the foregoing tables can be found based on the indexes. Certainly, the network device, the terminal device, a chip, and an apparatus may alternatively present the foregoing tables in a form of a set. To be specific, combinations of the TBSs and the quantities of resource units corresponding to all the indexes in the foregoing tables constitute one set, and the set is searched for a specific combination of a TBS and a quantity of resource units by using an index.

It should be noted that the method in the third implementation may also be applicable to the QPSK modulation mode, and a specific process is similar to a process corresponding to the Pi/2 BPSK modulation mode. Details are not described herein again.

It should be noted that, in the foregoing three possible implementations, in a process of determining the transport block size used for transmitting the uplink signal, optionally, that a quantity of involved resource units meets a preset condition is specifically as follows: When the quantity of resource units is 1, the maximum value of the TBS is 224 or 256; and/or when the quantity of resource units is 2, the maximum value of the TBS is 456 or 504; and/or when the quantity of resource units is 3, the maximum value of the TBS is 712 or 808; and/or when the quantity of resource units is 4, the maximum value of the TBS is 936 or 1000.

It can be learned from the foregoing descriptions that, after receiving the DCI sent by the network device, the terminal device may determine, based on the index indication information included in the DCI, the transport block size used for transmitting the uplink signal, and send the uplink signal on the two contiguous uplink subcarriers in the Pi/2 BPSK modulation mode based on the determined transport block size after determining the transport block size. It should be noted that, in this embodiment of this application, the terminal device may send the uplink signal to another terminal device to implement signal transmission between the two terminal devices, or may send the uplink signal to the network device to implement signal transmission between the terminal device and the network device.

Figure 3:
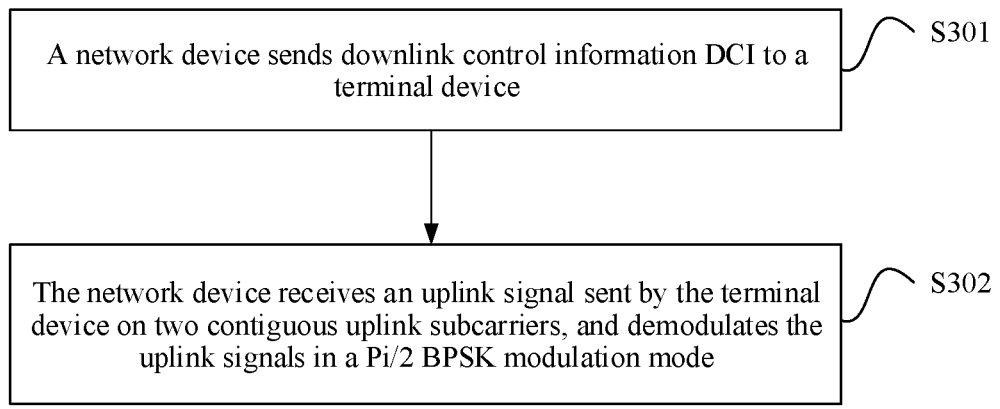
FIG. 3 is a schematic diagram of an uplink signal receiving method according to an embodiment of this application.

When the terminal device sends the uplink signal to the network device based on the determined transport block size, the network device needs to receive, on the two contiguous uplink subcarriers, the uplink signal sent by the terminal device, and demodulate the uplink signal in the Pi/2 BPSK modulation mode. Certainly, the network device first needs to send the DCI to the terminal device. For details, refer to FIG. 3. FIG. 3 is a schematic diagram of an uplink signal receiving method according to an embodiment of this application. The uplink signal receiving method may include the following steps:

S301: A network cable device sends downlink control information DCI to a terminal device.

S302: The network device receives an uplink signal sent by the terminal device on two contiguous uplink subcarriers, and demodulates the uplink signal in a Pi/2 BPSK modulation mode.

The two contiguous subcarriers may be two adjacent subcarriers of three contiguous subcarriers. Locations of the two subcarriers in the three subcarriers are cell-level unified, and may be fixed or may be configured by using higher layer signaling/RRC signaling.

It should be noted that, in this embodiment of this application, the DCI includes index indication information. Therefore, before sending the downlink control information DCI to the terminal device, the network device first needs to determine the index indication information. The index indication information may be determined in at least three possible implementations below.

In a possible implementation, an example in which a field used to indicate the index indication information is four bits is used. In this case, there are 16 corresponding MCS indexes, and the Pi/2 BPSK modulation mode may be indicated by using five idle MCS indexes. The network device first determines resource unit quantity indication information, determines a TBS index based on the resource unit quantity indication information and a transport block size, and then determines a corresponding MCS index based on the TBS index and a first mapping relationship. In a second possible implementation, the network device first needs to determine a corresponding TBS index based on resource unit quantity indication information, carrier quantity indication information and/or the modulation mode information, and a transport block size, and then determines a corresponding MCS index based on the TBS index and a second mapping relationship. In a third possible implementation, the network device may directly determine a corresponding index based on a transport block size, where there is a mapping relationship between the index and the transport block size.

To describe the foregoing three possible implementations more clearly, the following describes the foregoing three possible implementations in detail by using specific embodiments.

In the first possible implementation, if the DCI includes index indication information and resource unit quantity indication information, and the index indication information is used to indicate an MCS index, the network device may first determine a TBS index based on the resource unit quantity indication information and a transport block size, and then determine the MCS index based on the TBS index and a first mapping relationship.

The first mapping relationship is used to indicate a relationship between an MCS index, a modulation mode, and a TBS index. Optionally, the first mapping relationship includes a first part and a second part. The first part is used to indicate a relationship between an MCS index, a QPSK modulation mode, and a TBS index, and the second part is used to indicate a relationship between an MCS index, the Pi/2 BPSK modulation mode, and a TBS index. Further, the second part includes five TBS indexes, and/or a maximum value of a transport block size in the second part is 936 or 1000.

Optionally, when a corresponding MCS index is determined based on a TBS index in the second part, the five TBS indexes in the second part are five TBS indexes in the first part. It should be noted that a transport block size corresponding to the TBS index in the first part and the resource unit quantity indication information is preset.

The TBS index in the first part may be determined based on the resource unit quantity indication information and the transport block size. In the QPSK modulation mode, when a quantity of resource units is N, the TBS index is determined based on a column corresponding to a $K^{th}$ physical resource block (PRB) in a TBS table that is set in an existing standard and the transport block size. In the Pi/2 BPSK modulation mode, when a quantity of resource units is 2×N, the TBS index is determined based on a column corresponding to a $K^{th}$ physical resource block (PRB) in a TBS table that is set in an existing standard and the transport block size, where N and K are positive integers.

For example, as shown in Table 19, in the QPSK modulation mode, the quantity N of resource units may be 1 or 2. If the quantity of resource units is 1, Table 19 is queried based on a column corresponding to a third PRB in the TBS table, and the transport block size, to determine the TBS index. If the quantity of resource units is 2, Table 19 is queried based on a column corresponding to a sixth PRB in the TBS table, and the transport block size, to determine the TBS index. In the Pi/2 BPSK modulation mode, the quantity of resource units is 2 or 4. If the quantity of resource units is 2, Table 19 is queried based on a column corresponding to a third PRB in the TBS table, and the transport block size, to determine the TBS index. If the quantity of resource units is 4, Table 19 is queried based on a column corresponding to a sixth PRB in the TBS table, and the transport block size, to determine the TBS index corresponding to the quantity of resource units and the transport block size.

When the MCS index is determined, an example in which a field used to indicate the index indication information includes four bits is also used. In this case, there are 16 MCS indexes. The existing standard specifies a relationship between QPSK modulation modes and TBS indexes corresponding to 11 MCS indexes 0 to 10. In this embodiment of this application, S unused MCS indexes may be set to S MCS indexes corresponding to the Pi/2 BPSK modulation mode, where S is a positive integer, and S is greater than 2 and less than or equal to 5. It should be noted that, if the first part includes the first 11 MCS indexes of the 16 MCS indexes (that is, the MCS indexes 0 to 10), the S unused MCS indexes may be the last S MCS indexes of the 16 MCS indexes, that is, the MCS indexes 11 to (11+S−1). Certainly, if the first part includes the last 11 MCS indexes of the 16 MCS indexes (that is, the MCS indexes 5 to 15), the S unused MCS indexes may be the first S MCS indexes of the 16 MCS indexes, that is, the MCS indexes (0+5−S) to 4.

Optionally, when the TBS index in the second part is determined, the TBS index in the second part may be any one of TBS indexes 0 to 11 in the first part. However, for even distribution, the TBS index in the first part may be selected at an equal interval, to serve as the TBS index corresponding to the MCS index in the second part. Certainly, the TBS index in the first part may be selected at an unequal interval, to serve as the TBS index corresponding to the MCS index in the second part. The following specifically describes how to determine the five MCS indexes in the second part.

In a first case, when the first part includes the MCS indexes 0 to 10, the second part includes the MCS indexes 11 to (11+S−1). When S=3, refer to Table 1. It can be learned that the MCS indexes 0 to 10 in the first part all correspond to the QPSK mode, and the MCS indexes 0 to 10 are in a one-to-one correspondence with the TBS indexes 0 to 10. The MCS indexes 11 to 13 in the second part all correspond to the Pi/2 BPSK mode. In the first part, the MCS index 11 corresponds to the TBS index 1, the MCS index 12 corresponds to the TBS index 5, and the MCS index 13 corresponds to the TBS index 9.

Certainly, in the second part, the MCS index 11 may alternatively correspond to the TBS index 2, the MCS index 12 corresponds to the TBS index 6, and the MCS index 13 corresponds to the TBS index 10. Refer to Table 2.

In addition, in the second part, the MCS index 11 may alternatively correspond to the TBS index 0, the MCS index 12 corresponds to the TBS index 5, and the MCS index 13 corresponds to the TBS index 9. Refer to Table 3.

In a second case, when the first part includes the MCS indexes 5 to 15, the second part includes the MCS indexes 2 to 4. Refer to Table 4. It can be learned that the MCS indexes 5 to 15 in the first part all correspond to the QPSK mode, and the MCS indexes 5 to 15 are in a one-to-one correspondence with the TBS indexes 0 to 10. The MCS indexes 0 to 4 in the second part all correspond to the Pi/2 BPSK mode. In the second part, the MCS index 2 corresponds to the TBS index 1, the MCS index 3 corresponds to the TBS index 5, and the MCS index 4 corresponds to the TBS index 9.

Certainly, in the second part, the MCS index 2 may alternatively correspond to the TBS index 2, the MCS index 3 corresponds to the TBS index 6, and the MCS index 4 corresponds to the TBS index 10. Refer to Table 5.

In addition, in the second part, the MCS index 2 may alternatively correspond to the TBS index 0, the MCS index 3 corresponds to the TBS index 5, and the MCS index 4 corresponds to the TBS index 9. Refer to Table 6.

Certainly, S may alternatively be equal to 4. When S is equal to 4, refer to Table 7. The MCS indexes 0 to 10 in the first part all correspond to the QPSK mode, and the MCS indexes 0 to 10 are in a one-to-one correspondence with the TBS indexes 0 to 10. The MCS indexes 11 to 14 in the second part all correspond to the Pi/2 BPSK mode. In the first part, the MCS index 11 corresponds to the TBS index 1, the MCS index 12 corresponds to the TBS index 4, the MCS index 13 corresponds to the TBS index 7, and the MCS index 14 corresponds to the TBS index 10.

Certainly, in the first part, the MCS index 11 may alternatively correspond to the TBS index 0, the MCS index 12 corresponds to the TBS index 3, the MCS index 13 corresponds to the TBS index 6, and the MCS index 14 corresponds to the TBS index 9. Refer to Table 8.

In addition, in the first part, the MCS index 11 may alternatively correspond to the TBS index 2, the MCS index 12 corresponds to the TBS index 4, the MCS index 13 corresponds to the TBS index 6, and the MCS index 14 corresponds to the TBS index 8. Refer to Table 9.

In the second case, when the first part includes the MCS indexes 5 to 15, the second part includes the MCS indexes 1 to 4. Refer to Table 10. The MCS indexes 5 to 15 in the first part all correspond to the QPSK mode, and the MCS indexes 5 to 15 are in a one-to-one correspondence with the TBS indexes 0 to 10. The MCS indexes 1 to 4 in the second part all correspond to the Pi/2 BPSK mode. In the second part, the MCS index 1 corresponds to the TBS index 1, the MCS index 2 corresponds to the TBS index 4, the MCS index 3 corresponds to the TBS index 7, and the MCS index 4 corresponds to the TBS index 10.

Certainly, in the second part, the MCS index 1 may alternatively correspond to the TBS index 0, the MCS index 2 corresponds to the TBS index 3, the MCS index 3 corresponds to the TBS index 6, and the MCS index 4 corresponds to the TBS index 9. Refer to Table 11.

In addition, in the second part, the MCS index 1 may alternatively correspond to the TBS index 2, the MCS index 2 corresponds to the TBS index 4, the MCS index 3 corresponds to the TBS index 6, and the MCS index 4 corresponds to the TBS index 8. Refer to Table 12.

Certainly, S may alternatively be equal to 5. When S is equal to 5, refer to Table 13. The MCS indexes 0 to 10 in the first part all correspond to the QPSK mode, and the MCS indexes 0 to 10 are in a one-to-one correspondence with the TBS indexes 0 to 10. The MCS indexes 11 to 15 in the second part all correspond to the Pi/2 BPSK mode. In the second part, the MCS index 11 corresponds to the TBS index 1, the MCS index 12 corresponds to the TBS index 3, the MCS index 13 corresponds to the TBS index 5, the MCS index 14 corresponds to the TBS index 7, and the MCS index 15 corresponds to the TBS index 9.

Certainly, in the second part, the MCS index 11 may alternatively correspond to the TBS index 2, the MCS index 12 corresponds to the TBS index 4, the MCS index 13 corresponds to the TBS index 6, the MCS index 14 corresponds to the TBS index 8, and the MCS index 15 corresponds to the TBS index 10. Refer to Table 14.

In addition, in the second part, the MCS index 11 may alternatively correspond to the TBS index 0, the MCS index 12 corresponds to the TBS index 2, the MCS index 13 corresponds to the TBS index 5, the MCS index 14 corresponds to the TBS index 7, and the MCS index 15 corresponds to the TBS index 9. Refer to Table 15.

In the second case, when the first part includes the MCS indexes 5 to 15, the second part includes the MCS indexes 0 to 4. Refer to Table 16. The MCS indexes 5 to 15 in the first part all correspond to the QPSK mode, and the MCS indexes 5 to 15 are in a one-to-one correspondence with the TBS indexes 0 to 10. In the second part, the MCS index 0 corresponds to the TBS index 1, the MCS index 1 corresponds to the TBS index 3, the MCS index 2 corresponds to the TBS index 5, the MCS index 3 corresponds to the TBS index 7, and the MCS index 4 corresponds to the TBS index 9.

Certainly, in the second part, the MCS index 0 may alternatively correspond to the TBS index 2, the MCS index 1 corresponds to the TBS index 4, the MCS index 2 corresponds to the TBS index 6, the MCS index 3 corresponds to the TBS index 8, and the MCS index 4 corresponds to the TBS index 10. Refer to Table 17.

In addition, in the second part, the MCS index 0 may alternatively correspond to the TBS index 0, the MCS index 1 corresponds to the TBS index 2, the MCS index 2 corresponds to the TBS index 5, the MCS index 3 corresponds to the TBS index 7, and the MCS index 4 corresponds to the TBS index 9. Refer to Table 18.

After the MCS index corresponding to the TBS index in the second part is determined by using Table 1 to Table 18, the resource unit quantity indication information and the index indication information that is used to indicate the MCS index may be sent to the terminal device.

It can be learned that, in this possible implementation, before the network device sends the DCI to the terminal device, if the DCI includes the index indication information and the resource unit quantity indication information, the terminal device first needs to determine the TBS index based on the resource unit quantity indication information and the transport block size, then determines the corresponding MCS index based on the TBS index and the first mapping relationship, sends the resource unit quantity indication information and the index indication information that is used to indicate the MCS index to the terminal device, receives the uplink signal sent by the terminal device on the two contiguous uplink subcarriers, and demodulates the uplink signal in the Pi/2 BPSK modulation mode. Therefore, the uplink signals can be received in the Pi/2 BPSK modulation mode.

In the second possible implementation, the network device may first determine a corresponding TBS index based on resource unit quantity indication information, carrier quantity indication information and/or the modulation mode information, and a transport block size, and determine a corresponding MCS index based on the TBS index and a second mapping relationship.

The second mapping relationship is used to indicate a relationship between an MCS index and a TBS index.

In this possible implementation, a same TBS table is used in the Pi/2 BPSK modulation mode and the QPSK modulation mode. Therefore, before the TBS index is determined, a modulation mode needs to be obtained in advance, and the modulation mode may be obtained by using the carrier quantity indication information and/or the modulation mode information. When the modulation mode is determined by using the carrier quantity indication information, if the carrier quantity indication information indicates that a quantity of carriers is 2, it is determined that the modulation mode is the pi/2 BPSK modulation mode; or if the carrier quantity indication information indicates that a quantity of carriers is 3 or 6, it is determined that the modulation mode is the QPSK modulation mode. Certainly, if the modulation mode is determined by using the modulation mode information, the modulation mode may be an identifier of the QPSK modulation mode or the pi/2 BPSK modulation mode. Certainly, the modulation mode may be alternatively determined in another manner.

Similarly, an example in which a field used to indicate the index indication information includes four bits is used. In this case, there are 16 corresponding MCS indexes. The existing standard specifies a relationship between QPSK modulation modes and TBS indexes corresponding to 11 MCS indexes. When an MCS index corresponding to a TBS index in the Pi/2 BPSK modulation mode is determined, referring to Table 19, a same TBS table is used in the Pi/2 BPSK modulation mode and the QPSK modulation mode. It can be learned that, when the modulation mode is the Pi/2 BPSK modulation mode, pieces of resource unit quantity indication information corresponding to the Pi/2 BPSK modulation mode are also in a one-to-one correspondence with transport block sizes corresponding to the Pi/2 BPSK modulation mode, so that a TBS index corresponding to resource unit quantity indication information and a transport block size in the Pi/2 BPSK modulation mode can be determined based on Table 19. After the TBS index is determined, the corresponding MCS index may be determined based on the TBS index and the second mapping relationship.

Optionally, when the TBS index is determined, and when the carrier quantity indication information and/or the modulation mode information indicate/indicates that the modulation mode is the QPSK modulation mode, and the resource unit quantity indication information indicates that a quantity of resource units is P, the TBS index is determined based on a column corresponding to an M$^{th}$ physical resource block (PRB) in a TBS table that is set in the standard and the transport block size; or when the carrier quantity indication information and/or the modulation mode information indicate/indicates that the modulation mode is the pi/2 BPSK modulation mode, and the resource unit quantity indication information indicates that a quantity of resource units is 2×P, the TBS index is determined based on a column corresponding to an M$^{th}$ physical resource block (PRB) in a TBS table that is set in the standard and the transport block size, where M and P are positive integers.

For example, in the QPSK modulation mode, the quantity N of resource units may be 1 or 2. If the quantity of resource units is 1, Table 19 is queried based on a column corresponding to a third PRB in the TBS table and the transport block size, to determine the TBS index. If the quantity of resource units is 2, Table 19 is queried based on a column corresponding to a sixth PRB in the TBS table and the transport block size, to determine the TBS index. In the Pi/2 BPSK modulation mode, the quantity of resource units is 2 or 4. If the quantity of resource units is 2, Table 19 is queried based on a column corresponding to a third PRB in the TBS table and the transport block size, to determine the TBS index. If the quantity of resource units is 4, Table 19 is queried based on a column corresponding to a sixth PRB in the TBS table and the transport block size, to determine the TBS index. Then, the corresponding MCS index is determined based on the TBS index and the second mapping relationship. Optionally, a maximum value of the TBS is 936, 1000, or 1032. Therefore, a maximum quantity of transport blocks that can be supported by two contiguous uplink subcarriers is 936 or 1000.

After the TBS index is determined, the corresponding MCS index may be determined based on the TBS index and the second mapping relationship. Similarly, an example in which a field used to indicate the index indication information includes four bits is used. When the MCS index corresponding to the TBS index in the Pi/2 BPSK modulation mode is determined, referring to Table 20, it can be learned that, when the modulation mode is the Pi/2 BPSK modulation mode, the corresponding TBS indexes are also in a one-to-one correspondence with the MCS indexes. Therefore, the MCS index corresponding to the TBS index in the Pi/2 BPSK modulation mode may be determined based on the second mapping relationship in Table 20.

It can be learned that, in this possible implementation, before the network device sends the DCI to the terminal device, if the DCI includes the carrier quantity indication information and/or the modulation mode information, the index indication information, and the resource unit quantity indication information, the network device first needs to determine the TBS index based on the resource unit quantity indication information and the transport block size, determines the modulation mode based on the carrier quantity indication information and/or the modulation mode information, determines the corresponding MCS index based on the TBS index and the second mapping relationship, sends the resource unit quantity indication information and the indication information that is used to indicate the MCS index to the terminal device, receives the uplink signal sent by the terminal device on the two contiguous uplink subcarriers, and demodulates the uplink signals in the Pi/2 BPSK modulation mode. Therefore, the uplink signals can be received in the Pi/2 BPSK modulation mode.

In the third possible implementation, the network device may directly determine, based on a transport block size, index indication information corresponding to the transport block size, where there is a mapping relationship between the index indication information and the transport block size.

The DCI includes the index indication information, and there is the mapping relationship between the index indication information and the transport block size.

An example in which a field used to indicate the index indication information is four bits is used. In this case, a maximum of 16 indexes can be supported. As shown in Table 21, there are a total of 22 transport block sizes in the second column in Table 21. Two transport block sizes each are 208, two transport block sizes each are 256, two transport block sizes each are 328, two transport block sizes each are 504, and the like. Either of two equal transport block sizes may be deleted. In other words, only one of two equal numbers in each group is retained. In this case, there are still 17 remaining transport block sizes, and one of the 17 remaining transport block sizes further needs to be deleted. For example, in this embodiment of this application, deletion may be performed based on a proximity degree between transport block sizes. In this embodiment of this application, 144 or 152 may be deleted because 144 and 152 are relatively close, or 408 or 392 may be deleted because 408 and 392 are relatively close. Therefore, there are 16 remaining transport block sizes. The mapping relationship between the index indication information and the transport block size may be applied to the Pi/2 BPSK modulation mode. For example, the index indication information may be used to indicate an index. When 16 indexes corresponding to 16 transport block sizes are determined, 408 may be deleted. In addition, it can be learned from Table 22 that, after 408 is deleted from the 17 values, there are 16 remaining transport block sizes. Because the transport block sizes are in a one-to-one correspondence with the indexes, the network device may directly determine the index based on the transport block size used for transmitting the uplink signal.

Certainly, when the 16 indexes corresponding to the 16 transport block sizes are determined, 152 may be alternatively deleted. Refer to Table 23. It can be learned that, after 152 is deleted from the 17 values, there are 16 remaining transport block sizes. Because the indexes are in a one-to-one correspondence with the transport block sizes, the network device may directly determine the index indication information based on the transport block size used for transmitting the uplink signal.

In addition, when the 16 indexes corresponding to the 16 transport block sizes are determined, 144 may be alternatively deleted. Refer to Table 24. It can be learned that, after 144 is deleted from the 17 values, there are 16 remaining transport block sizes. Because the indexes are in a one-to-one correspondence with the transport block sizes, the network device may directly determine the index indication information based on the transport block size used for transmitting the uplink signal.

It can be learned that, in this possible implementation, before the network device sends the DCI to the terminal device, if the DCI includes the index indication information, the network device may directly determine the index indication information based on the relationship between the index indication information and the transport block size, then send the index indication information to the terminal device, receive the uplink signal sent by the terminal device on the two contiguous uplink subcarriers, and demodulate the uplink signal in the Pi/2 BPSK modulation mode. Therefore, the uplink signals can be received in the Pi/2 BPSK modulation mode.

It should be noted that the method in the third implementation may also be applicable to the QPSK modulation mode, and a specific process is similar to a process corresponding to the Pi/2 BPSK modulation mode. Details are not described herein again.

In the foregoing three possible implementations, in an index determining process, optionally, that a quantity of involved resource units meets a preset condition is specifically as follows: When the quantity of resource units is 1, the maximum value of the TBS is 224 or 256; and/or when the quantity of resource units is 2, the maximum value of the TBS is 456 or 504; and/or when the quantity of resource units is 3, the maximum value of the TBS is 712 or 808; and/or when the quantity of resource units is 4, the maximum value of the TBS is 936 or 1000.

It should be noted that, when the network device determines the MCS index or the index in the foregoing three possible implementations, a manner used by the network device matches a manner used by the terminal device to determine, in the three possible implementations, the transport block size used for transmitting the uplink signal. For example, when the network device determines the MCS index in the DCI in the first possible implementation, after the terminal device receives the DCI including the MCS index, the terminal device correspondingly determines, based on the DCI in the first possible implementation of the terminal device, the transport block size used for transmitting the uplink signal. Certainly, if the network device determines the MCS index in the DCI in the second possible implementation, after the terminal device receives the DCI including the MCS index, the terminal device correspondingly determines, based on the DCI in the second possible implementation of the terminal device, the transport block size used for transmitting the uplink signal.

Figure 4:
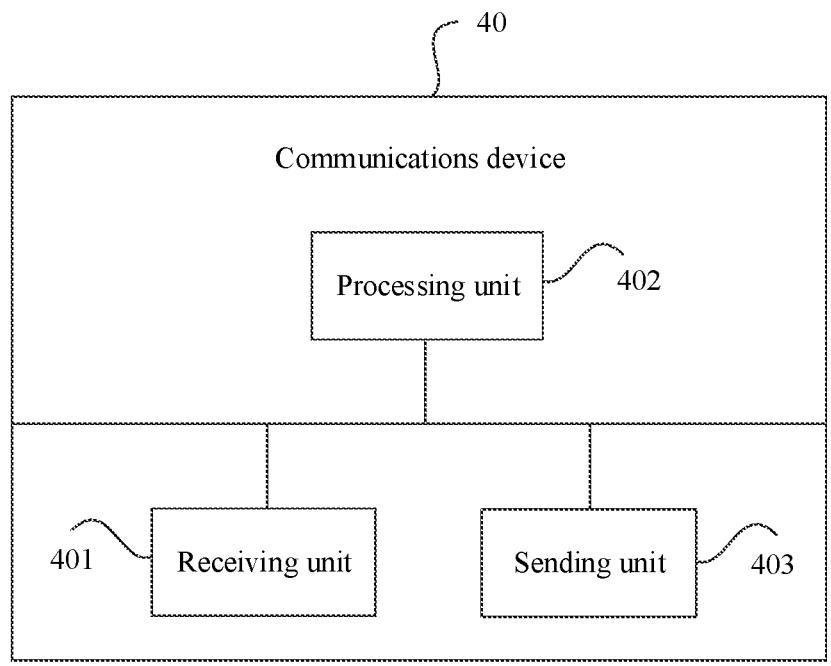
FIG. 4 is a schematic structural diagram of a communications device according to an embodiment of this application.

FIG. 4 is a schematic structural diagram of a communications device 40 according to an embodiment of this application. As shown in FIG. 4, the communications device 40 may include:

a receiving unit 401, configured to receive downlink control information DCI sent by a network device;

a processing unit 402, configured to determine, based on the DCI, a transport block size TBS used for transmitting an uplink signal; and a sending unit 403, configured to send the uplink signal on two contiguous uplink subcarriers in a Pi/2 BPSK modulation mode based on the determined transport block size.

Optionally, the DCI includes index indication information and resource unit quantity indication information, and the index indication information is used to indicate an MCS index.

The processing unit 402 is specifically configured to: determine a TBS index based on the index indication information and a first mapping relationship, where the first mapping relationship is used to indicate a relationship between an MCS index, a modulation mode, and a TBS index; and determine, based on the TBS index and the resource unit quantity indication information, the transport block size used for transmitting the uplink signal.

The first mapping relationship includes a first part and a second part, the first part is used to indicate a relationship between an MCS index, a QPSK modulation mode, and a TBS index, and the second part is used to indicate a relationship between an MCS index, the Pi/2 BPSK modulation mode, and a TBS index.

The second part includes S TBS indexes, and/or a maximum value of a transport block size in the second part is 936 or 1000, where S is a positive integer, and S is greater than 2 and less than or equal to 5.

Optionally, when the MCS index indicated by the index indication information belongs to the first part and a quantity of resource units is N, the TBS is determined based on a column corresponding to a $K^{th}$ physical resource block PRB in a TBS table that is set in an existing standard and the TBS index corresponding to the index indication information; or when the MCS index indicated by the index indication information belongs to the second part and a quantity of resource units is 2×N, the TBS is determined based on a column corresponding to a $K^{th}$ PRB in a TBS table that is set in an existing standard and the TBS index corresponding to the index indication information, where N and K are positive integers.

Optionally, the DCI includes index indication information and resource unit quantity indication information, the index indication information is used to indicate an MCS index, the DCI further includes carrier quantity indication information and/or modulation mode information, and the carrier quantity indication information and/or the modulation mode information are/is used to determine a modulation mode.

The processing unit 402 is further specifically configured to: determine a TBS index based on the MCS index and a second mapping relationship, where the second mapping relationship is used to indicate a relationship between an MCS index and a TBS index; and determine, based on the TBS index, the resource unit quantity indication information, and the carrier quantity indication information and/or the modulation mode information, the transport block size used for transmitting the uplink signal.

Optionally, when the carrier quantity indication information and/or the modulation mode information indicate/indicates that the modulation mode is a QPSK modulation mode, and the resource unit quantity indication information indicates that a quantity of resource units is P, the TBS is determined based on a column corresponding to an $M^{th}$ PRB in a TBS table that is set in a standard and the TBS index corresponding to the index indication information; or when the carrier quantity indication information and/or the modulation mode information indicate/indicates that the modulation mode is the pi/2 BPSK modulation mode, and the resource unit quantity indication information indicates that a quantity of resource units is 2×P, the TBS is determined based on a column corresponding to an $M^{th}$ PRB in a TBS table that is set in a standard and the TBS index corresponding to the index indication information, where M and K are positive integers.

Optionally, the DCI includes index indication information, and there is a mapping relationship between the index indication information and the transport block size.

The processing unit 402 is further specifically configured to determine the transport block size for the uplink signal based on the index indication information.

A maximum value of the TBS is 224, 256, 456, 504, 712, 808, 936, or 1000.

Optionally, the processing unit 402 is further configured to determine a quantity of resource units based on the index indication information.

The communications device 40 shown in this embodiment of this application may perform the technical solution of the uplink signal sending method shown in any one of the foregoing embodiments. Implementation principles and beneficial effects are similar, and details are not described herein again.

Figure 5:
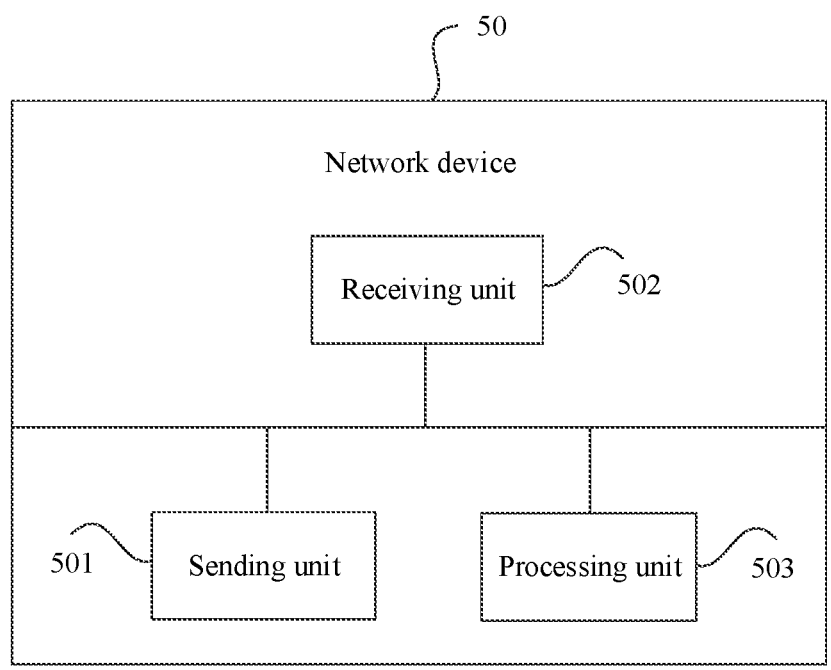
FIG. 5 is a schematic structural diagram of a network device according to an embodiment of this application.

FIG. 5 is a schematic structural diagram of a network device 50 according to an embodiment of this application. As shown in FIG. 5, the network device 50 may include:

a sending unit 501, configured to send downlink control information DCI to a terminal device;

a receiving unit 502, configured to receive an uplink signal sent by the terminal device on two contiguous uplink subcarriers; and a processing unit 503, configured to demodulate the uplink signal in a Pi/2 BPSK modulation mode.

Optionally, the DCI includes index indication information and resource unit quantity indication information, and the index indication information is used to indicate an MCS index.

The processing unit 503 is further configured to: determine a TBS index based on the resource unit quantity indication information and a transport block size; and determine the MCS index based on the TBS index and a first mapping relationship, where the first mapping relationship is used to indicate a relationship between an MCS index, a modulation mode, and a TBS index.

The first mapping relationship includes a first part and a second part, the first part is used to indicate a relationship between an MCS index, a QPSK modulation mode, and a TBS index, and the second part is used to indicate a relationship between an MCS index, the Pi/2 BPSK modulation mode, and a TBS index.

The second part includes S TBS indexes, and/or a maximum value of a transport block size in the second part is 936 or 1000.

Optionally, when the MCS index indicated by the index indication information belongs to the first part and a quantity of resource units is N, the TBS index is determined based on a column corresponding to a $K^{th}$ physical resource block PRB in a TBS table that is set in an existing standard and the transport block size; or when the MCS index indicated by the index indication information belongs to the second part and a quantity of resource units is 2×N, the TBS index is determined based on a column corresponding to a $K^{th}$ PRB in a TBS table that is set in an existing standard and the transport block size, where N and K are positive integers.

Optionally, the DCI includes index indication information and resource unit quantity indication information, the index indication information is used to indicate an MCS index, the DCI further includes carrier quantity indication information and/or modulation mode information, and the carrier quantity indication information and/or the modulation mode information are/is used to determine a modulation mode.

The processing unit 503 is further configured to: determine a TBS index based on the resource unit quantity indication information, the carrier quantity indication information and/or the modulation mode information, and a transport block size; and determine the MCS index based on the TBS index and a second mapping relationship, where the second mapping relationship is used to indicate a relationship between an MCS index and a TBS index.

Optionally, when the carrier quantity indication information and/or the modulation mode information indicate/indicates that the modulation mode is a QPSK modulation mode, and the resource unit quantity indication information indicates that a quantity of resource units is P, the TBS index is determined based on a column corresponding to an $M^{th}$ PRB in a TBS table that is set in a standard and the transport block size; or when the carrier quantity indication information and/or the modulation mode information indicate/indicates that the modulation mode is the pi/2 BPSK modulation mode, and the resource unit quantity indication information indicates that a quantity of resource units is 2×P, the TBS index is determined based on a column corresponding to an $M^{th}$ PRB in a TBS table that is set in a standard and the transport block size, where M and K are positive integers.

Optionally, the DCI includes index indication information, and there is a mapping relationship between the index indication information and a transport block size.

The processing unit 503 is further configured to determine the index indication information based on the transport block size.

A maximum value of the TBS is 224, 256, 456, 504, 712, 808, 936, or 1000.

Optionally, the processing unit 503 is further configured to determine a quantity of resource units based on the transport block size.

The network device 50 shown in this embodiment of this application may perform the technical solution of the uplink signal receiving method shown in any one of the foregoing embodiments. Implementation principles and beneficial effects are similar, and details are not described herein again.

Figure 6:
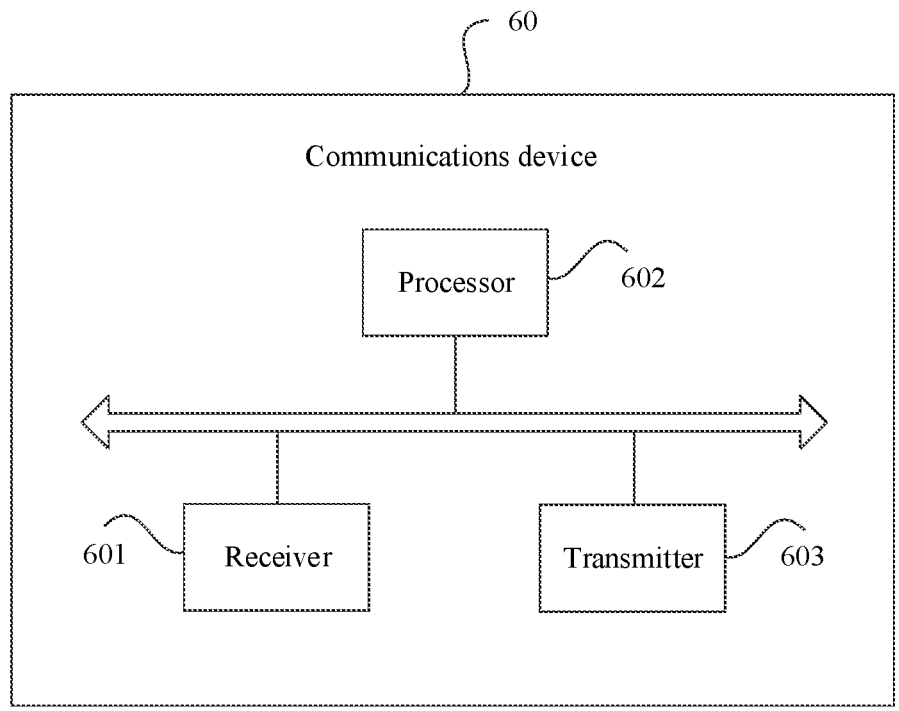
FIG. 6 is a schematic structural diagram of another communications device according to an embodiment of this application.

FIG. 6 is a schematic structural diagram of another communications device 60 according to an embodiment of this application. As shown in FIG. 6, the communications device 60 may include a receiver 601, a processor 602, and a transmitter 603. The receiver 601, the processor 602, and the transmitter 603 are connected by using a communications bus.

The receiver 601 is configured to receive downlink control information DCI sent by a network device.

The processor 602 is configured to determine, based on the DCI, a transport block size TBS used for transmitting an uplink signal.

The transmitter 603 is configured to send the uplink signal on two contiguous uplink subcarriers in a Pi/2 BPSK modulation mode based on the determined transport block size.

Optionally, the DCI includes index indication information and resource unit quantity indication information, and the index indication information is used to indicate an MCS index.

The processor 602 is specifically configured to: determine a TBS index based on the index indication information and a first mapping relationship, where the first mapping relationship is used to indicate a relationship between an MCS index, a modulation mode, and a TBS index; and determine, based on the TBS index and the resource unit quantity indication information, the transport block size used for transmitting the uplink signal.

The first mapping relationship includes a first part and a second part, the first part is used to indicate a relationship between an MCS index, a QPSK modulation mode, and a TBS index, and the second part is used to indicate a relationship between an MCS index, the Pi/2 BPSK modulation mode, and a TBS index.

The second part includes S TBS indexes, and/or a maximum value of a transport block size in the second part is 936 or 1000, where S is a positive integer, and S is greater than 2 and less than or equal to 5.

Optionally, when the MCS index indicated by the index indication information belongs to the first part and a quantity of resource units is N, the TBS is determined based on a column corresponding to a $K^{th}$ physical resource block PRB in a TBS table that is set in an existing standard and the TBS index corresponding to the index indication information; or when the MCS index indicated by the index indication information belongs to the second part and a quantity of resource units is 2×N, the TBS is determined based on a column corresponding to a $K^{th}$ PRB in a TBS table that is set in an existing standard and the TBS index corresponding to the index indication information, where N and K are positive integers.

Optionally, the DCI includes index indication information and resource unit quantity indication information, the index indication information is used to indicate an MCS index, the DCI further includes carrier quantity indication information and/or modulation mode information, and the carrier quantity indication information and/or the modulation mode information are/is used to determine a modulation mode.

The processor 602 is further specifically configured to: determine a TBS index based on the MCS index and a second mapping relationship, where the second mapping relationship is used to indicate a relationship between an MCS index and a TBS index; and determine, based on the TBS index, the resource unit quantity indication information, and the carrier quantity indication information and/or the modulation mode information, the transport block size used for transmitting the uplink signal.

Optionally, when the carrier quantity indication information and/or the modulation mode information indicate/indicates that the modulation mode is a QPSK modulation mode, and the resource unit quantity indication information indicates that a quantity of resource units is P, the TBS is determined based on a column corresponding to an $M^{th}$ PRB in a TBS table that is set in a standard and the TBS index corresponding to the index indication information; or when the carrier quantity indication information and/or the modulation mode information indicate/indicates that the modulation mode is the pi/2 BPSK modulation mode, and the resource unit quantity indication information indicates that a quantity of resource units is 2×P, the TBS is determined based on a column corresponding to an $M^{th}$ PRB in a TBS table that is set in a standard and the TBS index corresponding to the index indication information, where M and K are positive integers.

Optionally, the DCI includes index indication information, and there is a mapping relationship between the index indication information and the transport block size.

The processor 602 is further specifically configured to determine the transport block size for the uplink signal based on the index indication information.

A maximum value of the TBS is 224, 256, 456, 504, 712, 808, 936, or 1000.

Optionally, the processor 602 is further configured to determine a quantity of resource units based on the index indication information.

The communications device 60 shown in this embodiment of this application may perform the technical solution of the uplink signal sending method shown in any one of the foregoing embodiments. Implementation principles and beneficial effects are similar, and details are not described herein again.

Figure 7:
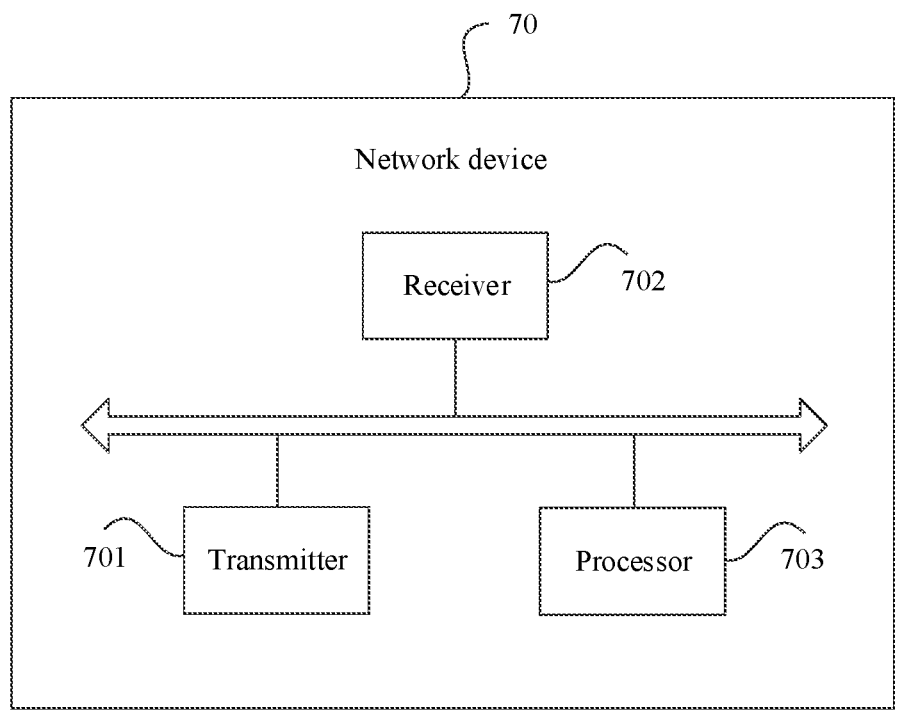
FIG. 7 is a schematic structural diagram of another network device according to an embodiment of this application.

FIG. 7 is a schematic structural diagram of another network device 70 according to an embodiment of this application. As shown in FIG. 7, the network device 70 may include a transmitter 701, a receiver 702, and a processor 703. The transmitter 701, the receiver 702, and the processor 703 are connected by using a communications bus.

The transmitter 701 is configured to send downlink control information DCI to a terminal device.

The receiver 702 is configured to receive an uplink signal sent by the terminal device on two contiguous uplink subcarriers.

The processor 703 is configured to demodulate the uplink signal in a Pi/2 BPSK modulation mode.

Optionally, the DCI includes index indication information and resource unit quantity indication information, and the index indication information is used to indicate an MCS index.

The processor 703 is further configured to: determine a TBS index based on the resource unit quantity indication information and a transport block size; and determine the MCS index based on the TBS index and a first mapping relationship, where the first mapping relationship is used to indicate a relationship between an MCS index, a modulation mode, and a TBS index.

The first mapping relationship includes a first part and a second part, the first part is used to indicate a relationship between an MCS index, a QPSK modulation mode, and a TBS index, and the second part is used to indicate a relationship between an MCS index, the Pi/2 BPSK modulation mode, and a TBS index.

The second part includes S TBS indexes, and/or a maximum value of a transport block size in the second part is 936 or 1000.

Optionally, when the MCS index indicated by the index indication information belongs to the first part and a quantity of resource units is N, the TBS index is determined based on a column corresponding to a $K^{th}$ physical resource block PRB in a TBS table that is set in an existing standard and the transport block size; or when the MCS index indicated by the index indication information belongs to the second part and a quantity of resource units is 2×N, the TBS index is determined based on a column corresponding to a $K^{th}$ PRB in a TBS table that is set in an existing standard and the transport block size, where N and K are positive integers.

Optionally, the DCI includes index indication information and resource unit quantity indication information, the index indication information is used to indicate an MCS index, the DCI further includes carrier quantity indication information and/or modulation mode information, and the carrier quantity indication information and/or the modulation mode information are/is used to determine a modulation mode.

The processor 703 is further configured to: determine a TBS index based on the resource unit quantity indication information, the carrier quantity indication information and/or the modulation mode information, and a transport block size; and determine the MCS index based on the TBS index and a second mapping relationship, where the second mapping relationship is used to indicate a relationship between an MCS index and a TBS index.

Optionally, when the carrier quantity indication information and/or the modulation mode information indicate/indicates that the modulation mode is a QPSK modulation mode, and the resource unit quantity indication information indicates that a quantity of resource units is P, the TBS index is determined based on a column corresponding to an $M^{th}$ PRB in a TBS table that is set in a standard and the transport block size; or when the carrier quantity indication information and/or the modulation mode information indicate/indicates that the modulation mode is the pi/2 BPSK modulation mode, and the resource unit quantity indication information indicates that a quantity of resource units is 2×P, the TBS index is determined based on a column corresponding to an $M^{th}$ PRB in a TBS table that is set in a standard and the transport block size, where M and K are positive integers.

Optionally, the DCI includes index indication information, and there is a mapping relationship between the index indication information and a transport block size.

The processor 703 is further configured to determine the index indication information based on the transport block size.

A maximum value of the TBS is 224, 256, 456, 504, 712, 808, 936, or 1000.

Optionally, the processor 703 is further configured to determine a quantity of resource units based on the transport block size.

The network device 70 shown in this embodiment of this application may perform the technical solution of the uplink signal receiving method shown in any one of the foregoing embodiments. Implementation principles and beneficial effects are similar, and details are not described herein again.

It should be noted that, in the embodiments shown in FIG. 4 to FIG. 7, optionally, the S TBS indexes in the second part are S TBS indexes in the first part. Optionally, a maximum value of the TBS is 936, 1000, or 1032. Optionally, when the quantity of resource units is 1, the maximum value of the TBS is 224 or 256; and/or when the quantity of resource units is 2, the maximum value of the TBS is 456 or 504; and/or when the quantity of resource units is 3, the maximum value of the TBS is 712 or 808; and/or when the quantity of resource units is 4, the maximum value of the TBS is 936 or 1000. Optionally, when a coverage level of the terminal device is ModeB, the quantity of resource units is 2 or 4.

Figure 8:
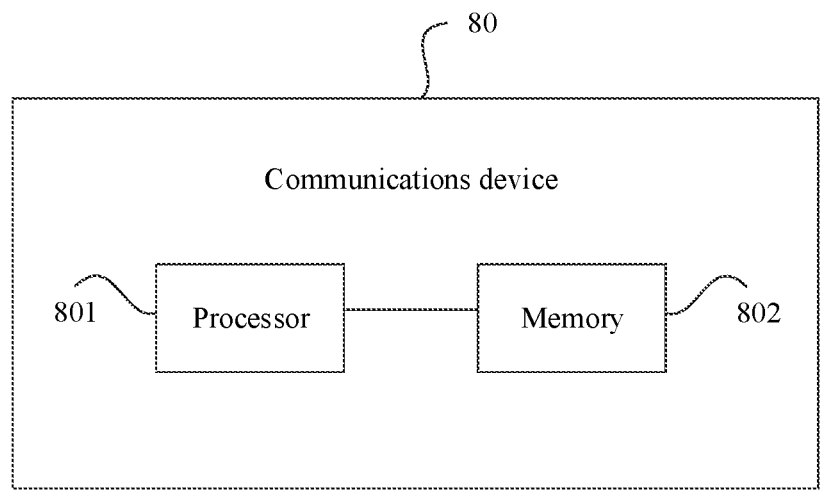
FIG. 8 is a schematic structural diagram of still another communications device according to an embodiment of this application.

FIG. 8 is a schematic structural diagram of still another communications device 80 according to an embodiment of this application. As shown in FIG. 8, the communications device 80 may include a processor 801 and a memory 802.

The memory 802 is configured to store a program instruction.

The processor 801 is configured to invoke and execute the program instruction stored in the memory, to perform the uplink signal sending method according to any one of the first aspect or the possible implementations of the first aspect.

The communications device 80 shown in this embodiment of this application may perform the technical solution of the uplink signal sending method shown in any one of the foregoing embodiments. Implementation principles and beneficial effects are similar, and details are not described herein again.

Figure 9:
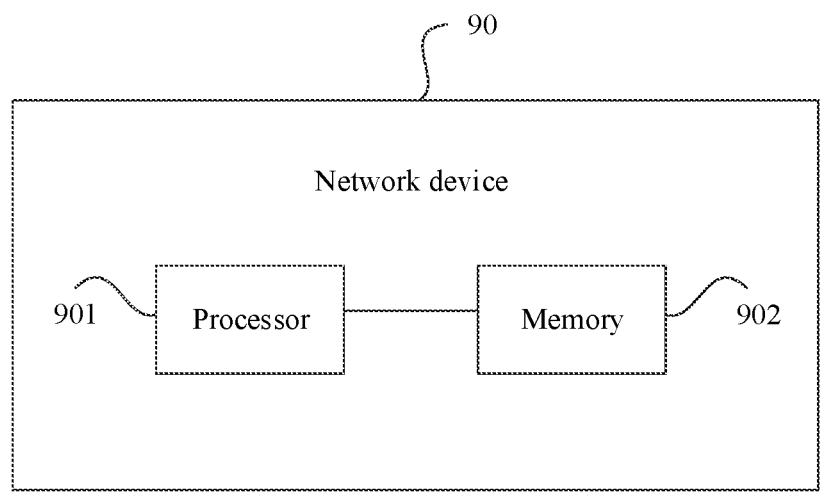
FIG. 9 is a schematic structural diagram of still another network device according to an embodiment of this application.

FIG. 9 is a schematic structural diagram of still another network device 90 according to an embodiment of this application. As shown in FIG. 9, the network device 90 may include a processor 901 and a memory 902.

The memory 902 is configured to store a program instruction.

The processor 901 is configured to invoke and execute the program instruction stored in the memory, to perform the uplink signal receiving method according to any one of the second aspect or the possible implementations of the second aspect.

The network device 90 shown in this embodiment of this application may perform the technical solution of the uplink signal receiving method shown in any one of the foregoing embodiments. Implementation principles and beneficial effects are similar, and details are not described herein again.

An embodiment of this application further provides a computer-readable storage medium. The computer-readable storage medium stores a computer program, and when the computer program is executed by a processor, the processor performs the uplink signal sending method shown in any one of the foregoing embodiments. Implementation principles and beneficial effects are similar, and details are not described herein again.

An embodiment of this application further provides a computer-readable storage medium. The computer-readable storage medium stores a computer program, and when the computer program is executed by a processor, the processor performs the uplink signal receiving method shown in any one of the foregoing embodiments. Implementation principles and beneficial effects are similar, and details are not described herein again.

An embodiment of this application further provides a chip. The chip stores a computer program, and when the computer program is executed by a processor, the processor performs the uplink signal sending method shown in any one of the foregoing embodiments. Implementation principles and beneficial effects are similar, and details are not described herein again.

An embodiment of this application further provides a chip. The chip stores a computer program, and when the computer program is executed by a processor, the processor performs the uplink signal receiving method shown in any one of the foregoing embodiments. Implementation principles and beneficial effects are similar, and details are not described herein again.

An embodiment of this application further provides a communications system. The communications system includes the communications device shown in any one of the foregoing embodiments and the network device shown in any one of the foregoing embodiments. Implementation principles and beneficial effects are similar, and details are not described herein again.

The processor in the foregoing embodiments may be a general purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and logical block diagrams that are disclosed in the embodiments of the present invention may be implemented or performed. The general purpose processor may be a microprocessor, any conventional processor, or the like. The steps of the methods disclosed with reference to the embodiments of the present invention may be directly executed and completed by using a hardware decoding processor, or may be executed and completed through a combination of hardware and software modules in the decoding processor. A software module may be located in a mature storage medium in the art, such as a random access memory (RAM), a flash memory, a read-only memory (ROM), a programmable read-only memory, an electrically erasable programmable memory, or a register. The storage medium is located in the memory 1002, and a processor 1001 reads an instruction in the memory 1002 and completes the steps in the foregoing methods in combination with hardware of the processor.

The bus in this application may be an industry standard architecture (ISA) bus, a peripheral component interconnect (PCI) bus, an extended industry standard architecture (EISA) bus, or the like. The bus may be an address bus, a data bus, a control bus, or the like. For ease of representation, the bus in the accompanying drawings of this application is not limited to only one bus or only one type of bus.

In the several embodiments provided in this application, it should be understood that the disclosed apparatus and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements, to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of hardware in addition to a software function unit.

What is claimed is:

1. An uplink signal sending method, comprising:
   receiving, by a terminal device, downlink control information (DCI) sent by a network device;
   determining, by the terminal device based on the DCI, a transport block size (TBS) used for transmitting an uplink signal; and
   sending, by the terminal device, the uplink signal on two contiguous uplink subcarriers in a Pi/2 binary phase shift keying (BPSK) modulation mode based on the determined TBS,
   wherein the DCI comprises index indication information and resource unit quantity indication information, and the index indication information is used to indicate a modulation and coding scheme (MCS) index; and
   a) the determining, by the terminal device based on the DCI, a TBS used for transmitting an uplink signal comprises:
      determining, by the terminal device, a TBS index based on the index indication information and a first mapping relationship, wherein the first mapping relationship is used to indicate a relationship between the MCS index, a modulation mode, and a TBS index; and
      determining, by the terminal device based on the TBS index and the resource unit quantity indication information, the TBS used for transmitting the uplink signal, wherein
      the first mapping relationship comprises a first part and a second part, the first part is used to indicate a relationship between an MCS index, a quadrature phase shift keying (QPSK) modulation mode, and a TBS index, and the second part is used to indicate a relationship between an MCS index, the Pi/2 BPSK modulation mode, and a TBS index; and
      the second part comprises S TBS indexes, and/or a maximum value of a transport block size in the second part is 936 or 1000, wherein S is a positive integer, and S is greater than 2 and less than or equal to 5,
   or
   b) the DCI further comprises carrier quantity indication information and/or modulation mode information, and the carrier quantity indication information and/or the modulation mode information are/is used to determine a modulation mode; and
      the determining, by the terminal device based on the DCI, a TBS used for transmitting an uplink signal comprises:
      determining, by the terminal device, a TBS index based on the MCS index and a second mapping relationship, wherein the second mapping relationship is used to indicate a relationship between the MCS index and the TBS index; and
      determining, by the terminal device based on the TBS index, the resource unit quantity indication information, and the carrier quantity indication information and/or the modulation mode information, the TBS used for transmitting the uplink signal.

2. The method according to claim 1, wherein
   when the MCS index indicated by the index indication information belongs to the first part and the quantity of resource units is N, the TBS is determined based on a column corresponding to a $K^{th}$ physical resource block (PRB) in a TBS table that is set in an existing standard and the TBS index corresponding to the index indication information; or
   when the MCS index indicated by the index indication information belongs to the second part and the quantity of resource units is 2×N, the TBS is determined based on a column corresponding to a $K^{th}$ PRB in a TBS table that is set in an existing standard and the TBS index corresponding to the index indication information, wherein
   N and K are positive integers.

3. The method according to claim 1, wherein
   when the carrier quantity indication information and/or the modulation mode information indicate/indicates that the modulation mode is a quadrature phase shift keying (QPSK) modulation mode, and the resource unit quantity indication information indicates that a quantity of resource units is P, the TBS is determined based on a column corresponding to an $M^{th}$ PRB in a TBS table that is set in the standard and the TBS index corresponding to the index indication information; or
   when the carrier quantity indication information and/or the modulation mode information indicate/indicates that the modulation mode is the pi/2 BPSK modulation mode, and the resource unit quantity indication information indicates that a quantity of resource units is 2×P, the TBS is determined based on a column corresponding to an $M^{th}$ PRB in a TBS table that is set in the standard and the TBS index corresponding to the index indication information, wherein
   M and K are positive integers.

4. The method according to claim 1, wherein the DCI comprises index indication information, and there is a mapping relationship between the index indication information and the transport block size; and
   the determining, by the terminal device based on the DCI, a TBS for the uplink signal comprises:
   determining, by the terminal device, the TBS for the uplink signal based on the index indication information, wherein
   a maximum value of the TBS is 224, 256, 456, 504, 712, 808, 936, or 1000.

5. The method according to claim 4, further comprising:
   determining, by the terminal device, a quantity of resource units based on the index indication information.

6. The method according to claim 1, wherein the S TBS indexes in the second part are S TBS indexes in the first part.

7. The method according to claim 1, wherein a maximum value of the TBS is 936, 1000, or 1032.

8. The method according to claim 1, wherein
when the quantity of resource units is 1, the maximum value of the TBS is 224 or 256; and/or
when the quantity of resource units is 2, the maximum value of the TBS is 456 or 504; and/or
when the quantity of resource units is 3, the maximum value of the TBS is 712 or 808; and/or
when the quantity of resource units is 4, the maximum value of the TBS is 936 or 1000.

9. The method according to claim 1, wherein when a coverage level of the terminal device is ModeB, the quantity of resource units is 2 or 4.

10. An uplink signal receiving method, comprising:
sending, by a network device, downlink control information (DCI) to a terminal device; and
receiving, by the network device, an uplink signal sent by the terminal device on two contiguous uplink subcarriers, and demodulating the uplink signal in a Pi/2 binary phase shift keying (BPSK) modulation mode,
wherein the DCI comprises index indication information and resource unit quantity indication information, and the index indication information is used to indicate a modulation and coding scheme (MCS) index; and
a) before the sending, by a network device, DCI to a terminal device, the method further comprises:
determining, by the network device, a transmit block size (TBS) index based on the resource unit quantity indication information and the TBS; and
determining, by the network device, the MCS index based on the TBS index and a first mapping relationship, wherein the first mapping relationship is used to indicate a relationship between the MCS index, a modulation mode, and a TBS index, wherein
the first mapping relationship comprises a first part and a second part, the first part is used to indicate a relationship between an MCS index, a quadrature phase shift keying (QPSK)modulation mode, and a TBS index, and the second part is used to indicate a relationship between an MCS index, the Pi/2 BPSK modulation mode, and a TBS index; and
the second part comprises S TBS indexes, and/or a maximum value of a transport block size in the second part is 936 or 1000,
or
b) the DCI further comprises carrier quantity indication information and/or modulation mode information, and the carrier quantity indication information and/or the modulation mode information are/is used to determine a modulation mode; and
before the network device determines, based on the DCI, a TBS used for transmitting an uplink signal, the method further comprises:
determining, by the network device, the TBS index based on the resource unit quantity indication information, the carrier quantity indication information and/or the modulation mode information, and the TBS; and
determining, by the network device, the MCS index based on the TBS index and a second mapping relationship, wherein the second mapping relationship is used to indicate a relationship between the MCS index and the TBS index.

11. The method according to claim 10, wherein
when the MCS index indicated by the index indication information belongs to the first part and the quantity of resource units is N, the TBS index is determined based on a column corresponding to a $K^{th}$ physical resource block PRB in a TBS table that is set in an existing standard and the TBS; or
when the MCS index indicated by the index indication information belongs to the second part and the quantity of resource units is 2×N, the TBS index is determined based on a column corresponding to a $K^{th}$ PRB in a TBS table that is set in an existing standard and the TBS, wherein
N and K are positive integers.

12. The method according to claim 10, wherein
when the carrier quantity indication information and/or the modulation mode information indicate/indicates that the modulation mode is a QPSK modulation mode, and the resource unit quantity indication information indicates that a quantity of resource units is P, the TBS index is determined based on a column corresponding to an $M^{th}$ PRB in a TBS table that is set in the standard and the TBS; or
when the carrier quantity indication information and/or the modulation mode information indicate/indicates that the modulation mode is the pi/2 BPSK modulation mode, and the resource unit quantity indication information indicates that a quantity of resource units is 2×P, the TBS index is determined based on a column corresponding to an $M^{th}$ PRB in a TBS table that is set in the standard and the TBS, wherein
M and K are positive integers.

13. The method according to claim 10, wherein the DCI comprises index indication information, and there is a mapping relationship between the index indication information and the TBS; and before the network device determines the TBS for the uplink signal based on the DCI, the method further comprises:
determining, by the network device, the index indication information based on the TBS, wherein
a maximum value of the TBS is 224, 256, 456, 504, 712, 808, 936, or 1000.

14. The method according to claim 13, further comprising:
determining, by the network device, a quantity of resource units based on the TBS.

15. A communications device, comprising:
a receiving unit, configured to receive downlink control information (DCI) sent by a network device;
a processor, configured to determine, based on the DCI, a transport block size (TBS) used for transmitting an uplink signal; and
a sending unit, configured to send the uplink signal on two contiguous uplink subcarriers in a Pi/2 binary phase shift keying (BPSK) modulation mode based on the determined TBS,
wherein the DCI comprises index indication information and resource unit quantity indication information, and the index indication information is used to indicate a modulation and coding scheme (MCS) index; and
a) the processing unit is configured to:
determine a TBS index based on the index indication information and a first mapping relationship, wherein the first mapping relationship is used to indicate a relationship between the MCS index, a modulation mode, and a TBS index; and determine, based on the TBS index and the resource unit quantity indication information, the TBS used for transmitting the uplink signal, wherein the first mapping relationship comprises a first part and a second part, the first part is used to indicate a relationship between an MCS index, a quadrature phase shift keying (QPSK)modulation mode, and a TBS index, and the second part is used to indicate a relationship between an MCS index, the Pi/2 BPSK modulation mode, and a TBS index; and the second part comprises S TBS indexes, and/or a maximum value of a transport block size in the second part is 936 or 1000, wherein S is a positive integer, and S is greater than 2 and less than or equal to 5, or b) the DCI further comprises carrier quantity indication information and/or modulation mode information, and the carrier quantity indication information and/or the modulation mode information are/is used to determine a modulation mode; and the processor is further configured to determine, based on the DCI, a TBS used for transmitting an uplink signal by:

determining a TBS index based on the MCS index and a second mapping relationship, wherein the second mapping relationship is used to indicate a relationship between the MCS index and the TBS index; and determining, by the terminal device based on the TBS index, the resource unit quantity indication information, and the carrier quantity indication information and/or the modulation mode information, the TBS used for transmitting the uplink signal.

16. A communications device, comprising:

a sending unit, configured to send downlink control information (DCI) to a terminal device, wherein the DCI comprises index indication information and resource unit quantity indication information, and the index indication information is used to indicate a modulation and coding scheme (MCS) index;

a processor, configured to determine, based on the DCI, a transport block size (TBS) used for transmitting an uplink signal; and a receiving unit configured to receive an uplink signal sent by the terminal device on two contiguous uplink subcarriers, and demodulate the uplink signal in a Pi/2 binary phase shift keying (BPSK) modulation mode;

wherein the processor is further configured to:

a) before the sending unit sends DCI to the terminal device:

determine a transmit block size (TBS) index based on the resource unit quantity indication information and the TBS; and determine the MCS index based on the TBS index and a first mapping relationship, wherein the first mapping relationship is used to indicate a relationship between the MCS index, a modulation mode, and a TBS index, wherein the first mapping relationship comprises a first part and a second part, the first part is used to indicate a relationship between an MCS index, a quadrature phase shift keying (QPSK)modulation mode, and a TBS index, and the second part is used to indicate a relationship between an MCS index, the Pi/2 BPSK modulation mode, and a TBS index; and the second part comprises S TBS indexes, and/or a maximum value of a transport block size in the second part is 936 or 1000, or b) the DCI further comprises carrier quantity indication information and/or modulation mode information, and the carrier quantity indication information and/or the modulation mode information are/is used to determine a modulation mode; and before the processor determines, based on the DCI, a TBS used for transmitting an uplink signal:

determine the TBS index based on the resource unit quantity indication information, the carrier quantity indication information and/or the modulation mode information, and the TBS; and determine the MCS index based on the TBS index and a second mapping relationship, wherein the second mapping relationship is used to indicate a relationship between the MCS index and the TBS index.

* * * * *